US009971627B2

(12) United States Patent
Calciu et al.

(10) Patent No.: US 9,971,627 B2
(45) Date of Patent: May 15, 2018

(54) ENABLING MAXIMUM CONCURRENCY IN A HYBRID TRANSACTIONAL MEMORY SYSTEM

(71) Applicant: Intel Corporation, Santa Clara, CA (US)

(72) Inventors: Irina Calciu, Santa Clara, CA (US); Justin E. Gottschlich, Santa Clara, CA (US); Tatiana Shpeisman, Menlo Park, CA (US); Gilles A. Pokam, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 399 days.

(21) Appl. No.: 14/225,804

(22) Filed: Mar. 26, 2014

(65) Prior Publication Data

US 2015/0277967 A1  Oct. 1, 2015

(51) Int. Cl.
  *G06F 9/52* (2006.01)
  *G06F 9/46* (2006.01)

(52) U.S. Cl.
  CPC .............. *G06F 9/467* (2013.01); *G06F 9/528* (2013.01)

(58) Field of Classification Search
  CPC ....................................................... G06F 9/528
  See application file for complete search history.

(56) References Cited

U.S. PATENT DOCUMENTS

| 5,581,729 A | 12/1996 | Nishtala et al. |
| 5,701,503 A | 12/1997 | Singh et al. |
| 5,822,755 A | 10/1998 | Shippy |
| 6,240,413 B1 | 5/2001 | Learmont |
| 6,862,646 B2 | 3/2005 | Bonola et al. |
| 7,685,365 B2 | 3/2010 | Rajwar et al. |
| 8,001,538 B2 | 8/2011 | Gray et al. |
| 8,095,824 B2 | 1/2012 | Gray et al. |
| 8,180,971 B2 | 5/2012 | Scott et al. |
| 8,250,133 B2 | 8/2012 | Blumrich et al. |
| 8,316,194 B2 | 11/2012 | Adl-Tabatabai et al. |
| 8,352,688 B2 | 1/2013 | Chung et al. |

(Continued)

FOREIGN PATENT DOCUMENTS

| CN | 1755635 | 4/2006 |
| CN | 101310258 | 11/2008 |

(Continued)

OTHER PUBLICATIONS

Justin E. Gottschlich, et al., "Efficient Software Transactional Memory Using Commit-Time Invalidation," 2010, 10 pages.

(Continued)

*Primary Examiner* — Jacob A Petranek
(74) *Attorney, Agent, or Firm* — Trop, Pruner & Hu, P.C.

(57) ABSTRACT

In an embodiment of a transactional memory system, an apparatus includes a processor and an execution logic to enable concurrent execution of at least one first software transaction of a first software transaction mode and a second software transaction of a second software transaction mode and at least one hardware transaction of a first hardware transaction mode and at least one second hardware transaction of a second hardware transaction mode. In one example, the execution logic may be implemented within the processor. Other embodiments are described and claimed.

18 Claims, 11 Drawing Sheets

(56) References Cited

U.S. PATENT DOCUMENTS

| | | |
|---|---|---|
| 8,521,995 B2 | 8/2013 | Yamada et al. |
| 8,543,775 B2 | 9/2013 | Chung et al. |
| 8,661,204 B2 | 2/2014 | Dwarkadas et al. |
| 2006/0085591 A1 | 4/2006 | Kumar et al. |
| 2007/0143287 A1 | 6/2007 | Adl-Tabatabai et al. |
| 2007/0156780 A1 | 7/2007 | Saha et al. |
| 2007/0198781 A1 | 8/2007 | Dice et al. |
| 2007/0198978 A1* | 8/2007 | Dice ............... G06F 9/466 718/100 |
| 2007/0245099 A1 | 10/2007 | Gray et al. |
| 2008/0104332 A1 | 5/2008 | Gaither et al. |
| 2008/0189487 A1 | 8/2008 | Craske |
| 2009/0031310 A1* | 1/2009 | Lev ............... G06F 11/1405 718/101 |
| 2009/0172299 A1 | 7/2009 | Goodman et al. |
| 2009/0172306 A1 | 7/2009 | Nussbaum et al. |
| 2009/0183159 A1* | 7/2009 | Michael ............... G06F 9/467 718/101 |
| 2009/0259713 A1 | 10/2009 | Blumrich et al. |
| 2009/0276573 A1 | 11/2009 | Frank et al. |
| 2009/0282405 A1* | 11/2009 | Moir ............... G06F 9/52 718/100 |
| 2010/0037027 A1 | 2/2010 | Prudvi et al. |
| 2010/0169579 A1 | 7/2010 | Sheaffer et al. |
| 2010/0174875 A1* | 7/2010 | Dice ............... G06F 9/52 711/152 |
| 2010/0191930 A1 | 7/2010 | Groff et al. |
| 2010/0332765 A1* | 12/2010 | Cypher ............... G06F 12/0811 711/141 |
| 2011/0145637 A1* | 6/2011 | Gray ............... G06F 11/141 714/15 |
| 2011/0202725 A1* | 8/2011 | Rose ............... G06F 9/30021 711/118 |
| 2012/0124293 A1 | 5/2012 | Chung et al. |
| 2012/0144126 A1 | 6/2012 | Nimmala et al. |
| 2012/0233411 A1 | 9/2012 | Pohlack et al. |
| 2013/0297967 A1* | 11/2013 | Heller, Jr. ............... G06F 9/467 714/10 |
| 2013/0339618 A1 | 12/2013 | Alexander et al. |
| 2014/0006698 A1* | 1/2014 | Chappell ............... G06F 12/0842 711/105 |

FOREIGN PATENT DOCUMENTS

| | | |
|---|---|---|
| CN | 101326494 | 12/2008 |
| JP | 2001527242 | 12/2001 |
| JP | 201351388 | 4/2013 |
| KR | 10-2012-0104364 | 9/2012 |
| WO | WO 2013095441 | 6/2013 |

OTHER PUBLICATIONS

U.S. Appl. No. 14/129,936, filed Dec. 28, 2013, entitled, "Improved Transactional Memory Management Techniques," by Irina Calciu.

International Searching Authority, "Notification of Transmittal of the International Search Report and the Written Opinion of the International Searching Authority," dated Jul. 26, 2015, in International application No. PCT/US2015/022394.

Tamura, "Information Processing Society of Japan Report of Research Heisei", 21 (2009) 6 [DVD-ROM], Japan Information Processing Society of Japan, Mar. 27, 2010, pp. 1-7.

Japan Patent Patent Office, Office Action dated Aug. 3, 2017 in Japanese Patent Application No. 2016-551272.

Korea Intellectual Property Office, Office Action dated Jun. 13, 2017, in Korean Patent Application No. 10-2016-7023088.

Japan Patent Office, Notice of Allowance dated Feb. 1, 2018 in Japanese Patent Application No. 2016-551272.

Korea Intellectual Property Office, Notice of Allowance dated Nov. 23, 2017 in Korean Patent Application No. 10-2016-7023088.

* cited by examiner

ENABLING MAXIMUM CONCURRENCY IN A HYBRID TRANSACTIONAL MEMORY SYSTEM

BACKGROUND

In parallel programming computing environments, sharing access to the same memory locations requires proper management and synchronization, which can be relatively difficult to perform. Traditionally, synchronization between threads accessing shared memory has been realized using locks to protect shared data from simultaneous access. However, locks are often overly conservative in their serialization to shared data, which might not always be necessary at run-time, but is often challenging or impossible to determine when code is written.

Transactional memory has been proposed as an alternative solution, to allow threads to speculatively execute critical sections, called transactions, in parallel. If a conflict occurs at run-time, threads stall or roll back their transactions and execute them again to resolve the conflict. In transactional memory systems, threads can speculatively execute transactions without altering the contents of shared memory locations until the transactions subsequently commit. If a conflict is detected between two transactions, one of the transactions may be aborted so that the other transaction can commit, at which time the committed transaction may alter the contents of the shared memory locations.

DETAILED DESCRIPTION

Figure 1:
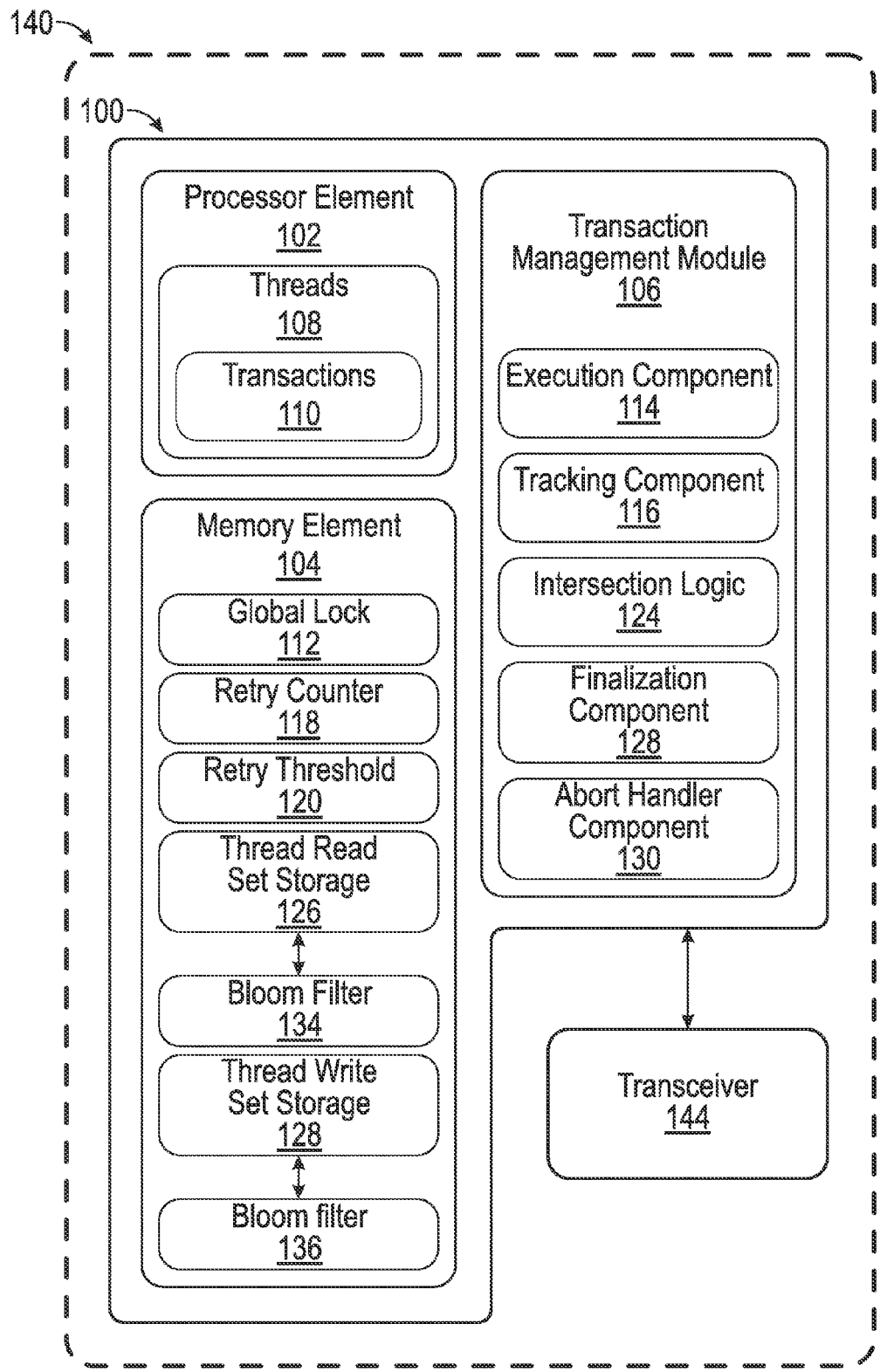
FIG. 1 is a block diagram of a system in accordance with an embodiment.

In various embodiments implementing a transactional memory system, conflicts may be determined between one or more hardware transactions running concurrently with one or more software transactions using information regarding accessed memory locations. In certain implementations this information may be maintained by way of filter sets associated with threads executing the transactions. More particularly, embodiments may implement these filter sets as so-called Bloom filters in which information regarding accessed memory locations may be stored.

In general, a Bloom filter may be implemented as a bit vector including a plurality of fields each providing a value associated with one or more memory locations. In operation, an accessed memory location address (or a portion thereof) is hashed with one or more hash values. The hash results are used to populate corresponding entries of the bit vector. More specifically, upon an access and hash computation, the indicated fields of the bit vector may be set at a logical one or active value to indicate that the corresponding address has been accessed. Similarly, any field having a logical zero or inactive value indicates that one or more given addresses of the memory have not been accessed.

Conflict detection may be performed at least in part using multiple Bloom filter values. More specifically, a Bloom filter for a first thread may have its contents compared with the contents of a Bloom filter for a second thread having a concurrently executing transaction. If the intersection comparison indicates that the access memory locations intersect in one or more positions, a conflict is detected and various operations to rollback or abort one or more of the transactions may occur. Instead if the intersection comparison indicates that accessed memory locations do not intersect, one or both of the transactions may proceed with commitment without conflict detection.

Embodiments may be used to determine conflicts between the hardware transactions running concurrently with a software transaction. Using an embodiment with a Bloom filter provided for each thread, hardware transactions that finish execution while a software global lock is held by a software transaction may be forced to abort only if a conflict is found. Bloom filters can sometimes allow false positives, so spurious aborts can still occur. Nonetheless, use of Bloom filters can improve the commit rate of the hardware transactions.

Embodiments may be used in a hybrid transactional memory (HTM) providing for both software transactions and hardware transactions using a single global lock to be acquired by a given software transaction. The hardware transactional memory may be implemented solely in processor hardware, which uses best efforts to complete a transaction to commitment. The software transactional memory is implemented entirely in software to synchronize shared memory in multithreaded programs.

At the end of a hardware transaction, the hardware transaction consults the single global lock. If the lock is free, the hardware transaction can successfully commit. In cases where the single global lock is not free, conflict detection may be performed using per thread Bloom filters that represent read and write sets of each transaction. In this way, non-conflicting hardware transactions can commit even if the single global lock is taken by a software transaction.

Embodiments thus enable an increase in the amount of concurrency realized in a hybrid transactional memory system. In order to detect conflicts between the software transaction and hardware transactions, each thread is associated with a Bloom filter. During execution of a transaction within a thread, each read and write is annotated to add the memory location to the Bloom filter. In an embodiment, this annotation may be done by a library call. However, other embodiments may in-line such annotations with read and write memory accesses. Alternately, a compiler may insert instructions to handle the Bloom filter insertions.

Upon completion of a hardware transaction (namely the critical section of the transaction), the transaction consults the global lock before committing and, if it is free, the transaction can commit successfully. However, if the lock is taken, the Bloom filter contents of the hardware transaction and the software transaction (that owns the global lock) are compared in an intersection operation to determine if there are conflicts. The Bloom filter allows false positives, but not false negatives. Therefore, a conflict may be detected despite the transactions not having an actual conflict, but the intersection comparison will not report zero conflicts if the transactions accessed the same memory location. As such, hardware transactions can commit successfully even if the lock is taken so long as the Bloom filters do not report conflicts.

In one particular hybrid transactional memory system, a single software transaction may concurrently execute with one or more hardware transactions. At a beginning of the software transaction, it acquires the single global lock to ensure exclusivity. Each hardware transaction reads this lock at the end of the critical section to determine if it can try to commit or it is to consult the Bloom filters. In an embodiment, the single global lock can store an identifier of the owner thread, thus indicating to a hardware transaction which Bloom filter to check for conflicts.

In an embodiment, the Bloom filters may be implemented as software Bloom filters. Using these filters, each transaction (hardware or software) adds each memory location read or written to its own Bloom filter as it reads/writes that location. At the end of a hardware transaction, the Bloom filter is used to identify conflicts with the software transaction currently holding the single global lock, if any.

Note that hardware transactions execute mostly in hardware, but have read and write accesses annotated so that they the locations read/written are entered into a per thread software Bloom filter. At commit time, hardware transactions check the global lock and if it is free they can commit, otherwise they compute the set intersection between their own Bloom filter and the software Bloom filter. If there are no conflicts, the hardware transaction can successfully commit. At commitment (after confirming no conflicts or filter intersections) updates performed by the hardware transaction become visible to the other threads by writing the updated values to memory (such that all updates become visible at once). If the transaction aborts, all updates are restored to their initial state.

A hardware transaction that aborts is retried multiple times. After N (which is a configurable parameter) retries, the hardware transaction is transitioned to a software transaction and seeks to acquire the single global lock. This transition ensures forward progress in an embodiment in which software transactions do not abort.

Only one software transaction can execute at any given time, in this embodiment. A software transaction can execute when its thread owns the single global lock. It acquires the lock by writing its thread identifier (ID) in the lock location and begins executing its critical section. All updates performed by the software transaction are in place (stated another way, the software transaction directly updates memory). Moreover, the software transaction also stores locations read/written in its thread's Bloom filter, to allow any concurrent hardware transactions to check for conflicts. A software transaction can never abort, in an embodiment.

A hybrid transactional memory approach may be used to realize the faster transaction execution and reduced overhead associated with hardware transactional memory while ensuring forward progress for handled transactions. According to a hybrid transactional memory approach, each transaction is initially handled in hardware, and subsequently handled in software if forward progress cannot be achieved in hardware. In various embodiments, a hybrid transactional memory system is provided in which a global lock is used to enable concurrent execution of a software transaction and one or more hardware transactions.

FIG. 1 is a block diagram of an apparatus 100. As shown in FIG. 1, apparatus 100 includes multiple elements including processor element 102, a memory element 104, and a transaction management module 106. The embodiments, however, are not limited to the type, number, or arrangement of elements shown.

In various embodiments, processor element 102 may be implemented using any processor or logic device capable of implementing task-level parallelism. In some embodiments, processor element 102 may be a multi-core processor. In another example embodiment, processor element 102 may be multiple processors arranged to perform tasks in parallel. Memory element 104 may be implemented using any machine-readable or computer-readable media capable of storing data, including both volatile and non-volatile memory. In some embodiments, memory element 104 may include a cache for processor element 102. In various embodiments, memory element 104 may additionally or alternatively include other types of data storage media, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. Some or all of memory element 104 may be included on the same integrated circuit as processor element 102, or alternatively some or all of memory element 104 may be disposed on an integrated circuit or other medium, for example a hard disk drive, that is external to the integrated circuit of processor element 102.

In some embodiments, transaction management module 106 may include circuitry, logic, other hardware and/or instructions to manage the performance of transactions according to a transactional memory paradigm. In various embodiments, transaction management module 106 may cause performance of both hardware transactions and software transactions. Hardware transactions may be transactions executed directly by logic device circuitry within processor element 102. Software transactions may be transactions executed indirectly by programming logic running on processor element 102.

As further shown in FIG. 1, a system 140 is provided including apparatus 100 and a transceiver 144. Transceiver 144 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area networks (WMANs), cellular networks, and satellite networks.

In some embodiments, processor element 102 may host one or more threads 108. Each thread 108 may correspond to an application or program running on processor element 102, and any particular application or program may have more than one associated thread 108. An application or program may use a particular thread 108 to request performance of one or more transactions 110. Transactions 110 may cause execution of various calculations or other tasks to be performed by processor element 102.

In various embodiments, when a thread 108 requests execution of a transaction, transaction management module 106 manages the transaction according to a hybrid transactional memory algorithm. In some embodiments, the hybrid transactional memory algorithm may implement multiple execution phases or modes during which attempts are made to execute and commit the transaction. In various embodiments, the hybrid transactional memory algorithm may include a hardware phase and a software phase. In some embodiments, transaction management module 106 may use the software phase for a transaction only after the hardware phase has been unsuccessful.

In some embodiments, transaction management module 106 may utilize a global lock 112 in order to enable the concurrent execution of a software transaction and one or more hardware transactions. In various embodiments, transaction management module 106 may cause global lock 112 to be set or active when a software transaction is undergoing execution, and cause global lock 112 to be cleared or inactive when no software transaction is undergoing execution. In some embodiments, global lock 112 may be a spin lock. In other embodiments, a Mellor-Crummey-Scott (MCS) lock may be used for global lock 112 in order to reduce contention on the lock cache line. In various such embodiments, the "MCS acquire" and "MCS release" methods may be utilized to take advantage of hardware transactions to speed up the performance of compare-and-swap (CAS) instructions. Still further, in some embodiments this global lock may be implemented using a filter mechanism as described herein.

In some embodiments, transaction management module 106 may enable a hardware transaction to commit if global lock is inactive 112 at the conclusion of the transaction and no other conflicts occurred during transaction execution. Instead if global lock 112 is active or taken when a hardware transaction seeks to commit, transaction management module 116 may determine whether a conflict exists between the hardware transaction and the pending software transaction by reference to information stored in Bloom filters associated with the threads initiating the transactions.

In various embodiments, transaction management module 106 may include execution logic 114. In some embodiments, execution logic 114 may be circuitry, other hardware and/or instructions to execute transactions 110. In various embodiments, each time a thread 108 requests execution of a new transaction, execution logic 114 may perform one or more executions of the transaction. In some embodiments, execution logic 114 may initially execute the transaction one or more times as a hardware transaction, and subsequently execute the transaction as a software transaction if it is unable to commit when executed in hardware. As such, in some embodiments the software transaction mode may be a fallback execution phase during which the transaction is assigned top priority to ensure that it will commit and that forward progress will be achieved. In some embodiments, execution logic 114 also may check global lock 112 at a conclusion of a hardware transaction.

In some embodiments, transaction management module 106 may include tracking logic 116. In various embodiments, tracking logic 116 may include circuitry, other hardware and/or instructions to manage global lock 112, a retry counter 118, and a retry threshold 120. In some embodiments, tracking logic 116 may set global lock 112 based on instructions from execution logic 114. For example, execution logic 114 may instruct tracking logic 116 to set global lock 112 when execution logic 114 begins execution of a transaction in the software phase. In various embodiments, retry counter 118 may include a running total number of attempts that have been made to perform a transaction in the hardware transaction mode. In some embodiments, retry threshold 120 may include a number of attempts after which execution logic 114 should proceed from execution as a hardware transaction to execution as a software transaction. In various embodiments, when a new transaction is received, tracking logic 116 may reset retry counter 118 (corresponding to the transaction) to zero. In some embodiments, after each unsuccessful execution of the transaction, tracking logic 116 may increment retry counter 118.

As further shown in FIG. 1, memory element 104 includes per thread read set storages 126 and per thread write set storages 128. In an embodiment, the storages may store information regarding values read or written during transactions. In addition, each thread may have associated with it a corresponding Bloom filter 134 and 136, each associated with a given read set storage or write set storage (and thread). As will be described further herein, during execution of a transaction, each read and write may be annotated into corresponding Bloom filter to indicate that a given memory address has been accessed during the transaction. This information may later be used to determine whether at least a potential conflict exists between concurrently executing transactions.

In various embodiments, transaction management module 106 may include finalization logic 128. In some embodiments, finalization logic 128 may include circuitry, other hardware and/or instructions to determine whether to commit or abort transactions after they are executed by execution logic 114. In various embodiments, finalization logic 128 may determine that any particular transaction is to be aborted when the transaction conflicts or potentially conflicts with another transaction. In some embodiments, finalization logic 128 may determine whether a transaction may potentially conflict with a concurrent software transaction by checking global lock 112. In various embodiments, if global lock 112 is set and the transaction is a hardware transaction, finalization logic 128 may then reference intersection logic 124 to determine whether at least a potential conflict exists between the hardware transaction and the software transaction. To this end, intersection logic 124 may access respective Bloom filters 134 and 136 of the threads initiating the transactions to determine whether filter sets intersect. If so, at least a potential conflict is present and as such, intersection logic 124 may report the active intersection to finalization logic 128. If instead the filter sets do not indicate an intersection, this inactive intersection is reported to finalization logic 128.

In turn, finalization logic 128 may cause the hardware transaction to be aborted if the intersection is found, and otherwise enable the hardware transaction to commit (assuming no other conflicts are detected).

In some embodiments, if global lock 112 is set and the transaction is a software transaction, finalization logic 128 may commit the transaction and instruct tracking logic 116 to release global lock 112. In various embodiments, if global lock 112 is not set, finalization logic 128 may commit a hardware transaction and instruct tracking logic 116 to clear retry counter 118, without a need for interaction with intersection logic 124 to determine whether filter sets indicate a potential conflict.

In some embodiments, transaction management module 106 may include abort handler logic 130. In various embodiments, abort handler logic 130 may include circuitry, other hardware and/or instructions to handle aborts of transactions indicated by finalization logic 128. In some embodiments, abort handler logic 130 may determine whether a next attempted performance of an aborted transaction should occur as a hardware transaction or as a software transaction. In various embodiments, abort handler logic 130 may determine whether the transaction is to be aborted due to a conflict or potential conflict with another transaction or for another reason. If the transaction was aborted for another reason, such as due to an illegal instruction, a capacity overflow, or a cache associativity overflow due to irregular memory access patterns, abort handler logic 130 may determine that execution logic 114 should proceed directly to the software phase. If the transaction was aborted due to a conflict or potential conflict with another transaction, abort handler logic 130 may determine whether the transaction should be retried the current phase or in a next phase, e.g., based on a number of retries.

In various embodiments, to determine whether a next attempted performance of an aborted transaction should be handled as a hardware transaction or a software transaction, abort handler logic 130 may compare retry counter 118 to retry threshold 120. In some embodiments, if retry counter 118 is less than retry threshold 120, abort handler logic 130 may instruct execution logic 114 to retry the transaction as a hardware transaction. Otherwise, abort handler logic 130 may instruct execution logic 114 to retry the transaction as a software transaction. In various embodiments, tracking logic 116 may adaptively determine a value for retry threshold 120 based on numbers of successful and/or unsuccessful commits for attempted transactions. Although shown at this high level in the FIG. 1 embodiment, understand the scope of the present invention is not limited in this regard, and hybrid transactional memory systems may take many different forms and have numerous variations.

Figure 2:
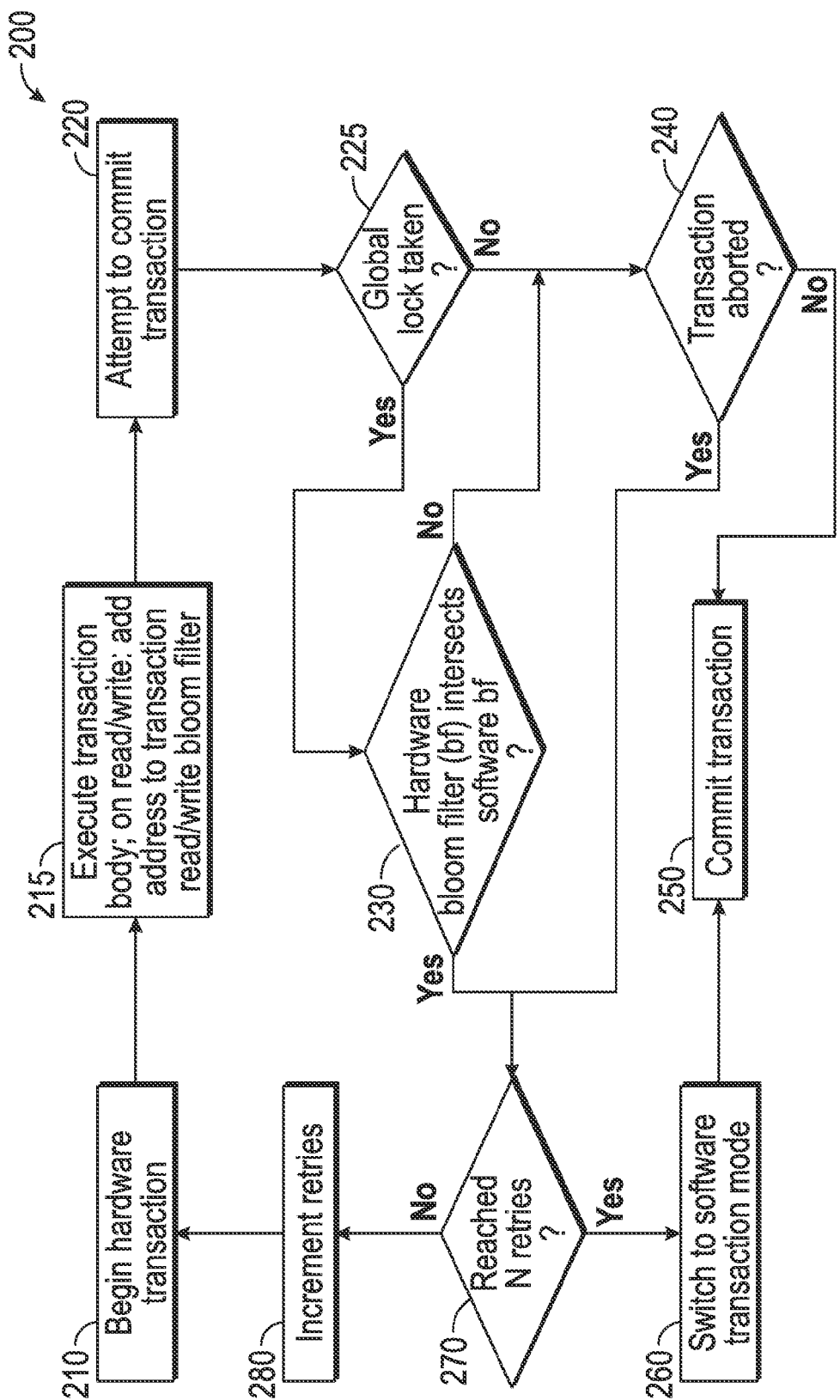
FIG. 2 is a high level flow diagram of execution of a transaction in accordance with an embodiment.

Referring now to FIG. 2, shown is a high level flow diagram of execution of a transaction in accordance with an embodiment. As seen in FIG. 2, according to method 200, all transactions begin execution in hardware as a hardware transaction (block 210). During execution (block 215) on each read or write, a transaction records each location read or written in a software Bloom filter for the corresponding thread. After a hardware transaction finishes execution of its critical section (block 220), it attempts to commit by checking for conflicts with the software transaction, if there is one. The hardware transaction first checks whether the global lock is taken (diamond 225). If this lock is free, then the hardware transaction can successfully commit (assuming no abort has occurred, as determined at diamond 240). If the lock is taken, the value of the lock indicates the index or identifier of the thread holding the lock, which is thus executing a software transaction.

In this case, the hardware transaction passes to diamond 230 to access the Bloom filter of the thread executing the software transaction to determine if there are any conflicts. More specifically, at diamond 230 an intersection operation may be performed between the 2 filters to determine whether any entries or fields of the 2 Bloom filters intersect (e.g., both have an active or logical one value). If so, the hardware transaction aborts, and control passes to diamond 270 to determine whether the number of retries of the given hardware transaction has reached the configurable number N. Note that various steps may be taken upon aborting transaction, including flushing out any updated values in a buffer or other storage associated with the thread.

If instead it is determined that there is no intersection between the Bloom filters, control passes to diamond 240 to determine whether the transaction has aborted, e.g., for another reason. If not, control passes to block 250 where the transaction is committed. For commitment, the hardware transaction may update memory with any updated values, which are previously stored in a buffer visible only to the given thread during the hardware transaction execution.

Also understand that although a determination as to whether a transaction aborts is shown at diamond 240 in the particular location in the FIG. 2 embodiment, it is possible for a hardware transaction to abort at any time during its execution by way of conflict detection logic, which may detect other types of conflicts or other reasons for aborting during the transaction. However for ease of illustration understand that diamond 240 is represented in the location shown in FIG. 2.

Still referring to FIG. 2, if it is determined at diamond 270 that the number of retries has not reached a threshold number N, control passes to block 280 where the number of retries is incremented, and then control passes back to block 210 for beginning the hardware transaction again. Otherwise, if the number of retries has reached the retry threshold of N, control instead passes from diamond 270 to block 260, where execution may switch to a software transaction mode. More specifically, in this implementation where only a single software transaction is permitted, the transaction may thus execute in the software transaction mode to completion, allowing the transaction to commit at block 250.

The Bloom filters ensure conflict detection between the software transaction and the hardware transactions. Conflict detection and resolution between hardware transactions is ensured by the hardware transactional memory system. The single global lock ensures there is only one software transaction running at any time, and as such no additional conflict detection mechanism is provided for software transactions, in an embodiment.

Figure 3:
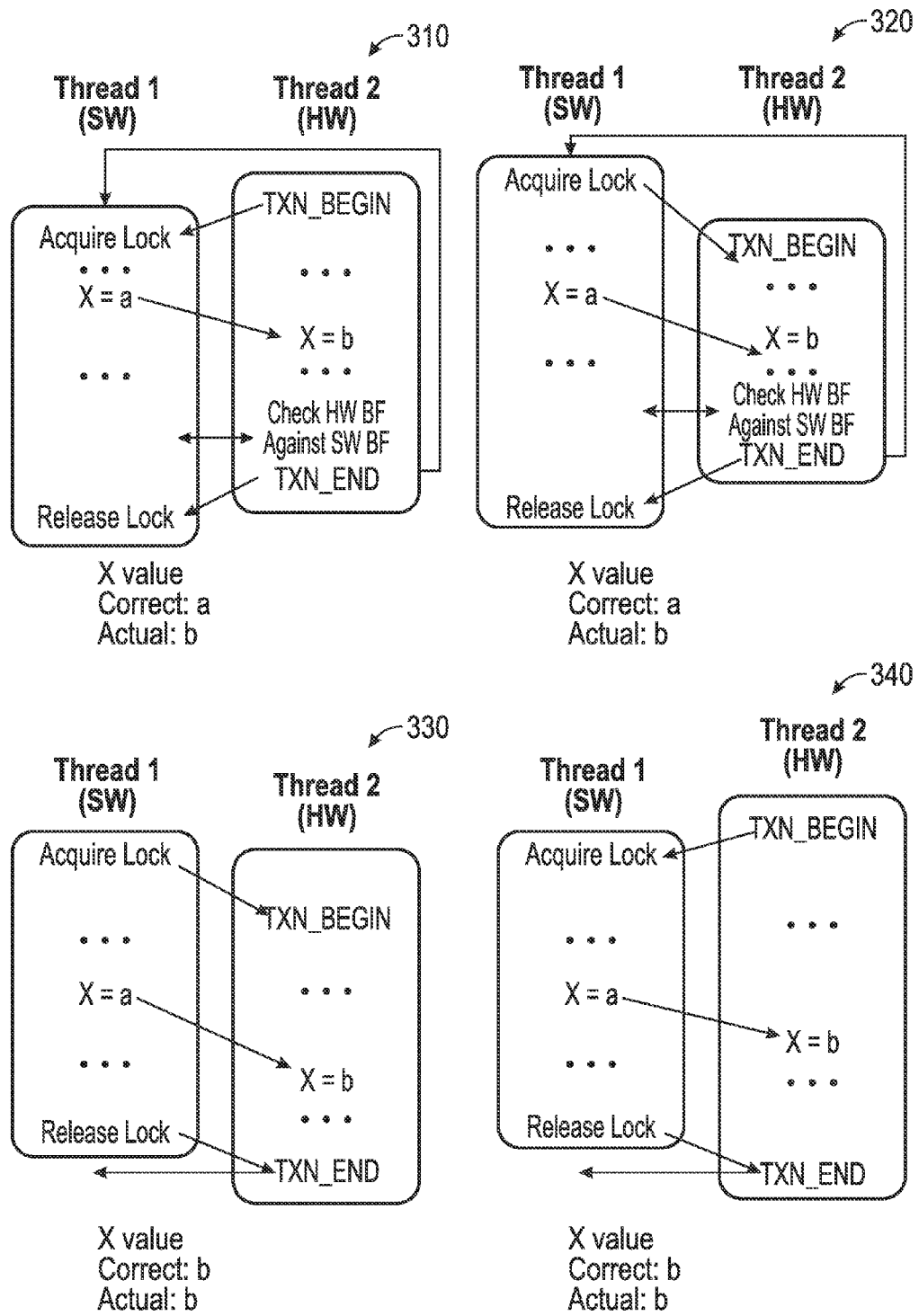
FIG. 3 shows possible timings between a hardware transaction and a software transaction in accordance with an embodiment.

FIG. 3 shows possible timings between a hardware transaction and a software transaction in accordance with an embodiment. In case 310, a software transaction first updates a variable X and later a hardware transaction updates the same variable X to a different value. When the hardware transaction attempts to commit, a filter set intersection is performed which identifies the dual accesses and thus a conflict is raised and the hardware transaction is aborted. Similar operation occurs in case 320. However in cases 330 and 340, at the point that the hardware transactions commit, the software thread has already committed and released the single global lock. As such, when the hardware thread checks this lock, it finds it released and thus the transactions can successfully commit.

In cases 330 and 340, the lock is free when the hardware transaction tries to commit, meaning there is no software transaction running concurrently. Even if there was an overlapping software transaction, it has already committed by this point, being serialized before the hardware transaction. If the software transaction would have performed any conflicting operations that serialized after the hardware transaction, the hardware transaction would have been aborted at the time of the conflict (because of the hardware conflict detection mechanism). Therefore enabling the hardware transaction to commit when the lock is free provides for correct behavior.

If instead the lock is taken when the hardware transaction tries to commit (as in cases 310 and 320), then a concurrent software transaction is executing. The committing hardware transaction is serialized before this software transaction because of possible future conflicting operations executed by the software transaction. However, the software transaction could have performed conflicting operations on one or more memory locations before the hardware transaction started tracking those locations, and thus serializing the hardware transaction before the software transaction would be incorrect behavior. Therefore, embodiments use the Bloom filters to determine this case.

Note that the software Bloom filters do not contain all the locations that the software transaction will access in the future, just the locations that the transaction has already accessed. Nevertheless, future accesses will be correctly serialized after the committed hardware transaction. Therefore, if the Bloom filters do not intersect, the hardware transaction can be correctly serialized before the software transaction and it can be allowed to commit. If the Bloom filter identifies conflicts, then the conflicting operations first occurred in the software transaction and then in the hardware transaction, otherwise the hardware transaction would have aborted. In this case, the hardware transaction cannot be serialized before the software transaction and is to be aborted. As such, embodiments correctly identify these conflicts and abort the hardware transaction. Note that it is possible for a Bloom filter to incorrectly report conflicts (as an undistinguishable false positive), so the hardware transaction will abort in these cases too, in an embodiment. However, Bloom filters do not cause false negatives, and as such all conflicts are identified and prevented In an embodiment, an efficient Bloom filter implementation allows insertion and set intersection in O(1) time, minimizing overhead. Moreover, hardware transactions only read the global lock and the software Bloom filter just prior to commitment, decreasing the window when hardware transactions could be aborted because of a software transaction modifying these locations. In an embodiment, reading the lock and the Bloom filter may only add two additional cache lines to a read set of the transaction. In some embodiments, this can be optimized so that a bit of the Bloom filter is used to indicate whether to lock is taken and the rest of the Bloom filter is used as a Bloom filter. In such implementation, the lock location can serve both purposes, reducing the read set size of the hardware transaction to just one additional location. The transaction's own Bloom filters add additional cache lines to a write set, but in an implementation, this could be as low as only one cache line, depending on the Bloom filter size.

Using an embodiment, many small hardware transactions that access disjoint memory accesses from themselves and concurrently executing large software transactions can commit. As one such example, consider an array representing an open addressing hash-table. Threads can perform lookup(x) operations and insert(x) operations in this hash table. Once a threshold of occupancy is achieved, a thread decides to double the size of the hash table by allocating a new array and re-hashing elements from the old array to the new array. Lookup and insert operations are short transactions and can succeed in hardware most of the time. Re-hashing may instead be executed as a software transaction (and the thread performing the re-hashing acquires the single global lock). In this case with precise conflict detection between the software transaction and the concurrent hardware transactions, lookup operations executed as hardware transactions can commit using data from the old array while re-hashing to the new array is taking place. Moreover, insert operations executed as hardware transactions that occur to the end of the old array (namely in the part that has not been re-hashed yet) can also commit during re-hashing. Therefore, embodiments improve throughput by allowing small hardware transactions to commit concurrently with long executing software transactions.

While providing a Bloom filter conflict detection technique as described above improves parallelism, there still can be inefficiencies given use of a single global lock in the above embodiments. In other embodiments, a transactional memory system may be provided that enables multiple hardware transactions and multiple software transactions to execute and commit in parallel. In general, a cache-based hardware transactional memory system may be used for the hardware component and an invalidation-based software transactional memory system may be used for the software component. These embodiments provide a hybrid transactional memory system that allows multiple hardware transactions to execute concurrently with multiple software transactions, while still guaranteeing forward progress.

Figure 4:
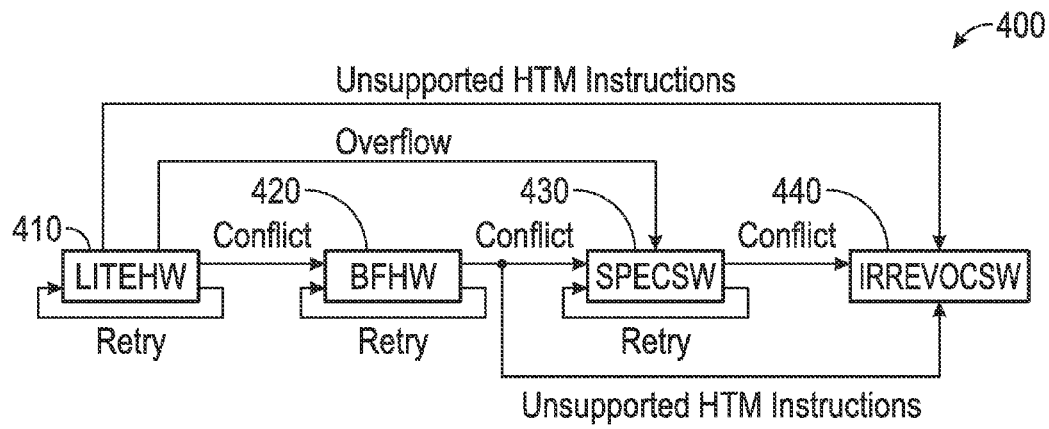
FIG. 4 is a block diagram of a hybrid transactional memory system flow in accordance with an embodiment of the present invention.

Referring now to FIG. 4, shown is a block diagram of a hybrid transactional memory system in accordance with an embodiment of the present invention. As shown in FIG. 4, a HTM system 400 provides for multiple hardware transaction modes and multiple software transaction modes. In the implementation shown in FIG. 4, transactions begin in a first hardware transaction mode 410, referred to herein as a light hardware (LiteHW) transaction mode. If an overflow or unsupported instruction occurs, the transaction is immediately upgraded to another type of transaction mode. Instead, if the transaction aborts for another reason (e.g., due to conflict), the transaction retries a number of times before being upgraded to a second hardware transaction mode 420, referred to herein as a Bloom filter hardware (BFHW) mode. Similar retries occur and then the transaction is updated to a first software transaction mode 430, referred to herein as a speculative software (SpecSW) mode, if it does not commit. Again in this mode, a transaction may be retried a number of times before the transaction is upgraded to a second software transaction mode 440, referred to herein as an irrevocable software (IrrevocSW) mode. Understand that while shown with the particular modes and interactions in FIG. 4, embodiments are not limited in this regard.

If most transactions are short, access memory that can fit within the TM-supported cache space, and contain no unsupported instructions, they can succeed directly in hardware, without the need to synchronize with software transactions. The most lightweight type of transaction is the first hardware transaction mode (LiteHW). This transaction type executes without any annotations for reads and writes and can commit successfully if there are no software transactions running at the time it tries to commit. This type of transaction is simple and fast, but it allows for little concurrency with software transactions.

The second hardware transaction mode, BFHW, uses software Bloom filters to record the locations read and written by the hardware transaction, to enable detection of conflicts with software transactions that execute concurrently. This transaction type adds extra overhead compared to the LiteHW transaction, but can commit even in the presence of concurrently executing software transactions. Hardware transactions are fast, but can fail in best-effort HTMs because of unsupported instructions or overflow, and thus software fallback is provided.

In turn, the first software transaction mode, SpecSW, performs a speculative software transaction in which the transaction records locations read and written in Bloom filters for conflict detection with other software and hardware transactions and stores all writes in a hash table for deferred updates during a commit phase. Invalidation occurs post-commitment to abort in-flight conflicting transactions and per transaction locks are used to ensure opacity. In this first software transaction mode, each read is validated to prevent zombie transactions (transactions that will abort) from reaching an inconsistent state.

Finally, the second software transaction mode, IrrevocSW, performs all updates in place (directly to memory) and cannot be aborted. Because of this quality, only one IrrevocSW transaction can execute at any given time. However, multiple SpecSW and BFHW transactions can execute concurrently with an IrrevocSW transaction.

Conflict detection between multiple software transactions is realized using the Bloom filters, as discussed above. Conflict detection between software and hardware transaction also uses the Bloom filters, however, using best-effort HTMs that do not have escape actions generally leads to aborting the hardware transactions upon conflict detection. This behavior is due to the hardware transactions' strong isolation: any memory location that is tracked by the hardware will cause a conflict, thereby aborting the hardware transaction when a software transaction performs a conflicting access to that location. Moreover, hardware updates do not become visible to the other threads until the hardware transaction commits.

Embodiments postpone conflict detection between hardware and software transactions until after the hardware transaction has committed. The hardware transaction then performs a post commit phase in which it invalidates all in-flight conflicting software transactions. Because the hardware transaction has already committed, sharing Bloom filter information with other threads cannot cause it to abort.

Each transaction, whether it is software or hardware, goes through a plurality of phases. The behavior in each of these phases depends on the type of transaction. The first phase is a beginning phase in which a transaction is started. A hardware transaction calls a start hardware transaction instruction, while a software transaction records information about the starting address and notifies other threads of its presence via an indicator such as a flag (e.g., a sw_exists flag) indicating existence of at least one software transaction.

During an execution phase, read and write operations are annotated and the behavior is decided by the type of transaction executing. All transaction types record accessed locations in Bloom filters, except for LiteHW transactions.

During an abort phase, hardware aborts are dealt with automatically by the hardware. For a software transaction, software clears information recorded during the transaction execution and restarts from the address stored during the begin phase.

During a commit phase, conflict detection is performed and memory updates are made if the transaction can commit. Its implementation is dependent on the transaction type.

During a post-commit phase, transactions may perform invalidation. Note that this phase is executed after the transaction has already committed and updated memory with its write set locations. This phase ensures that all in-flight software transactions that conflict with the transaction that just committed will be aborted.

Figure 5:
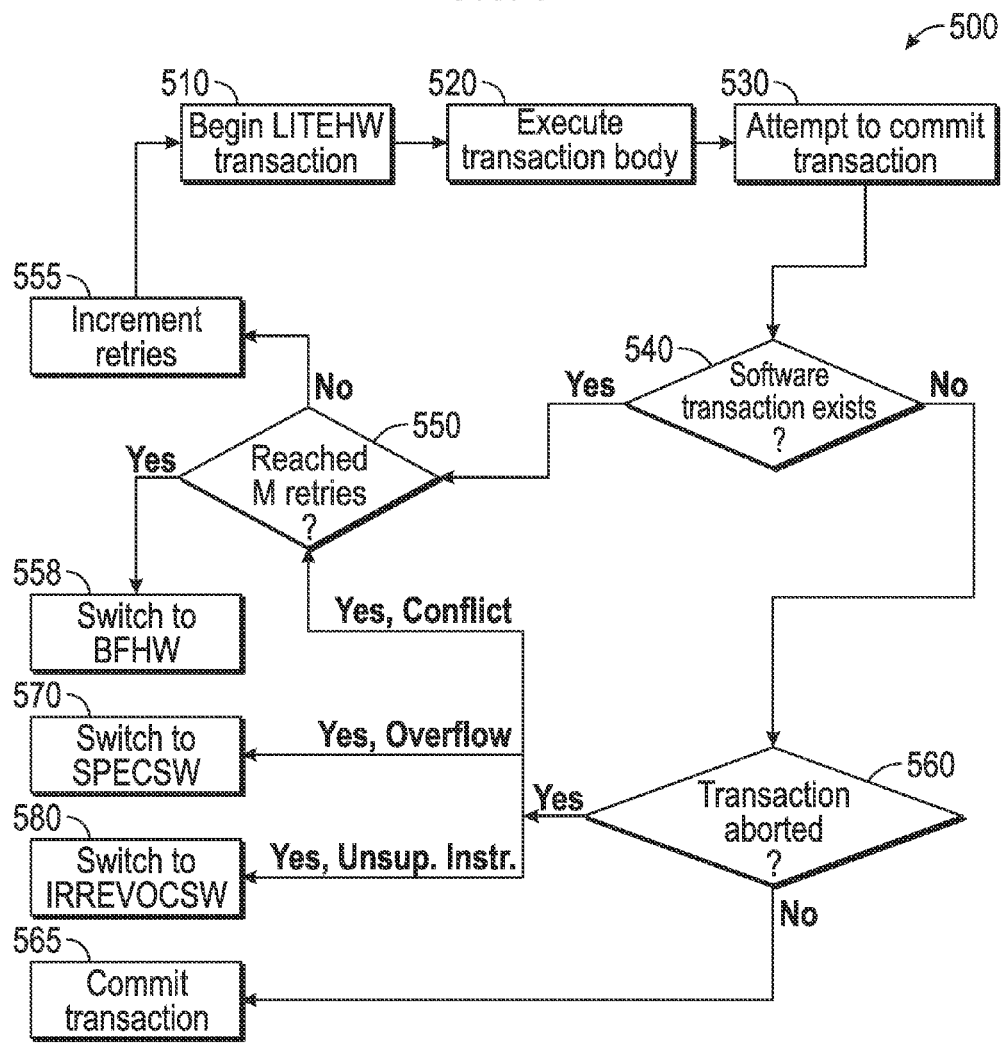
FIG. 5 is a flow diagram of execution of a first hardware transaction in accordance with an embodiment.

As briefly described above, the first hardware mode, LiteHW, is the simplest and fastest type because it introduces negligible additional software overhead and is executed entirely in hardware. A LiteHW transaction can only commit in the absence of software transactions. FIG. 5 is a flow diagram of execution of such a transaction in accordance with an embodiment. Method 500 begins execution of the hardware transaction, e.g., via a user-level hardware transaction start instruction (block 510). Next, the transaction body is executed (block 520). This critical section is performed without recording any of reads or writes. When the transaction attempts to commit (at block 530), it checks to see if there are any software transactions currently running (e.g., by checking the sw_exists flag (sw_exists !=0 if software transactions are executing)) (diamond 540). If there are concurrently executing software transactions, control passes to diamond 550 to determine whether a retry threshold (M) has been reached. If not, control passes to block 555, and the retry count is incremented. Control next passes back to block 510, above. If instead the transaction has been retried the threshold number of times, control passes to block 558, where the transaction switches to the second hardware transaction mode, BFHW mode.

If at diamond 540 it is determined that there are no software transactions executing (sw_exists=0), the transaction can successfully commit, assuming the transaction has not aborted at diamond 560. Because LiteHW is a hardware transaction, its commit may be performed instantaneously (block 565). If the transaction is aborted at any point during its execution by a hardware conflict detection mechanism, an abort handler checks the abort status set by the hardware to determine whether to retry this transaction in the same mode (at most M times), or to switch to SpecSW (block 570) (e.g., if the abort was caused by an overflow) or to IrrevocSW (block 580) (e.g., if the transaction was caused by unsupported instructions such as an input/output instruction).

Figure 6:
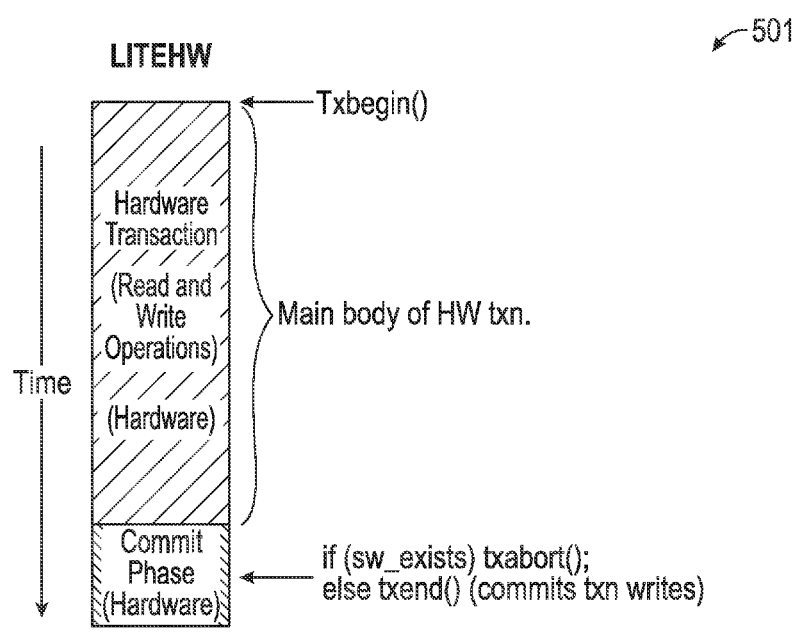
FIG. 6 illustrates details of the phases of a first hardware transaction in accordance with an embodiment.

FIG. 6 shows more details of the phases of a LiteHW transaction 501. During the begin phase, the transaction executes a begin hardware transaction instruction (for example, txbegin instruction). During execution, OnRead and OnWrite handlers (which are handlers such as library-based handlers to update Bloom filters with accesses) are empty. An OnAbort handler increments the number of retries and decides whether to retry the transaction as a LiteHW transaction or switch to a different mode, based on the number of retries and the abort reason. Finally, the commit phase, also executed in hardware, checks the sw_exists flag and calls the hardware transaction end instruction (e.g., txend instruction). This transaction type has no post commit phase.

Figure 7:
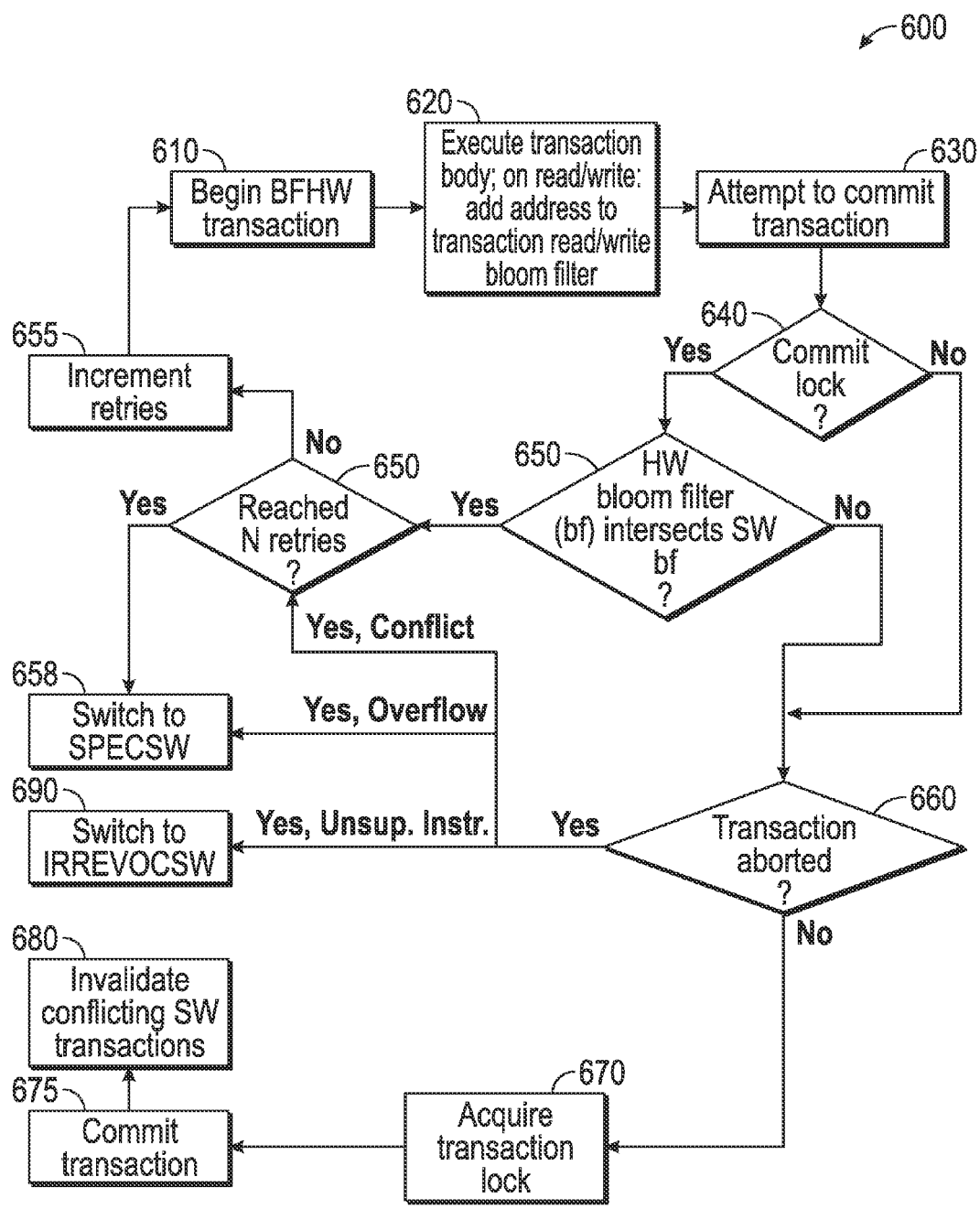
FIG. 7 is a flow diagram of execution of a second transaction in accordance with an embodiment.

FIG. 7 is a flow diagram of execution of a BFHW transaction in accordance with an embodiment. Method 600 begins execution of the hardware transaction, e.g. via a user-level hardware transaction start instruction (block 610). Next, the transaction body is executed (block 620). During its execution, the transaction records memory locations read or written in its read and write Bloom filters. When the transaction tries to commit (diamond 630), it checks whether a commit lock is taken (diamond 640). If the lock is free, and assuming no abort has occurred (as determined at diamond 660), the transaction acquires its own hardware transaction lock (at block 670) and commits (block 675).

If the transaction lock is taken, a software transaction is currently committing. In an embodiment, the simplest thing to do in this case is to abort, because the hardware transaction might have conflicting memory updates with the committing software transaction. This case is shown in more detail in FIG. 8, below.

Figure 9:
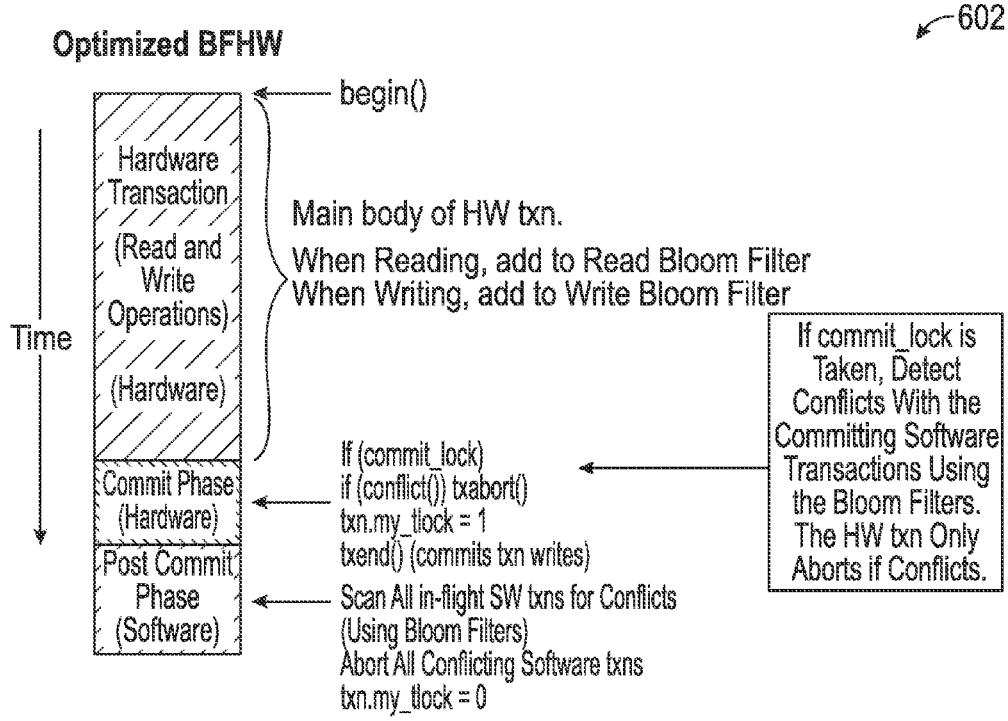
FIG. 9 illustrates details of an optimized Bloom filter-based hardware transaction in accordance with an embodiment.

However, a hardware transaction could commit while a software transaction is committing if it does not have any conflicts with the committing software transaction. This can be determined using a Bloom filter comparison. An optimized behavior of this hardware transaction mode is to check the Bloom filters of the committing software transaction if it finds the commit lock taken. If the Bloom filters indicate a conflict, the hardware transaction aborts, otherwise it can commit (after it acquires its own transaction lock as above). This case is shown in FIG. 9.

Similarly to LiteHW, an OnAbort handler determines whether to escalate to one of the multiple software modes (e.g., at blocks 658 and 690) or whether the number of retries has reached a threshold number has occurred (at diamond 650). Otherwise, the number of retries is incremented at block 655, and the transaction begins again at block 610.

Written transactional memory is committed entirely in hardware. First, the transaction determines if it can commit by checking the commit lock and the software Bloom filters (if the commit lock is taken) (at diamond 650). If there are no conflicts (either the lock is free or the hardware transaction's Bloom filter does not intersect with the software transaction's Bloom filter), the hardware transaction acquires its own transaction lock (at block 675) (shown as tlock in FIGS. 8 and 9). This lock is only acquired by the hardware transaction that owns it, so it will always be free when that transaction tries to acquire it. However, it is used to prevent races with software transactions beginning their commit phase, as described in more detail below.

Note that if the transaction is aborted, the transaction's lock is automatically released because it is part of its speculative write set. Moreover, the value written to the lock becomes visible to other threads only when the hardware transaction commits its changes to memory. If another thread checks this location after the lock has been taken but before changes have been committed to memory, the hardware transaction is aborted, ensuring that races are not possible.

Still referring to FIG. 7, after commitment at block 675, a post-commit phase for this second hardware transaction mode is executed in software, and occurs after the hardware transaction has committed its changes to memory. As seen, post-commit operation includes invalidating conflicting software transactions (block 680). Note that at this point, the hardware transaction is already committed, but it ensures that all software transactions that conflict with it will be aborted. This is achieved by checking the hardware transaction's Bloom filters against all in-flight software transaction's Bloom filters. If a conflict is detected, the software transaction is aborted. After finishing the invalidation process, the hardware transaction resets its lock.

Figure 8:
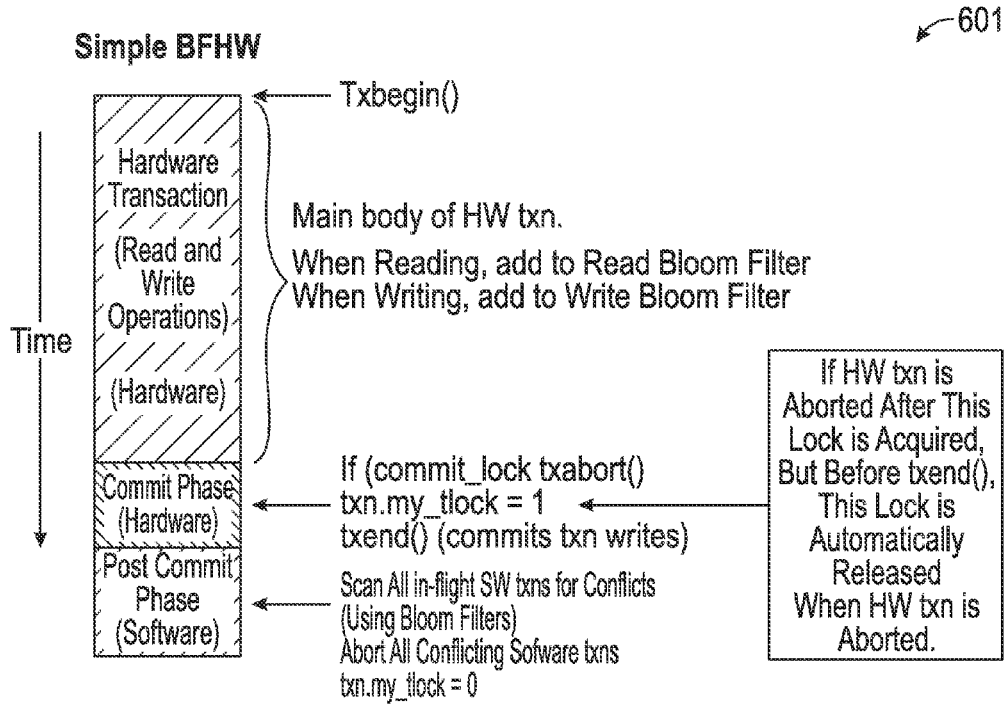
FIG. 8 illustrates details of a basic Bloom filter-based hardware transaction in accordance with an embodiment.

FIG. 8 shows further details of a basic Bloom filter-based hardware transaction 601 that includes a begin phase, an execution phase, a commit phase, and a post-commit phase. As seen, during execution, read and writes are added to the corresponding read and write Bloom filters. However understand that in other embodiments a single Bloom filter may be used for both read and write sets. Next, it is determined whether the commit lock is taken, and if so the transaction aborts in this basic implementation. Otherwise, a transaction lock is taken and the transaction writes are committed. Then in the post-commit phase, Bloom filter intersections are performed to abort all conflicting software transactions and thereafter the transaction lock is released.

FIG. 9 shows further details of an optimized Bloom filter-based hardware transaction 602 that includes a begin phase, an execution phase, a commit phase, and a post-commit phase. In this case, if the commit lock is taken, conflicts may be detected using Bloom filter intersections to determine whether conflicts are present, and if not, the hardware thread may commit, and if a conflict is present the transaction aborts. Otherwise operation occurs similarly to that of FIG. 8.

Figure 10:
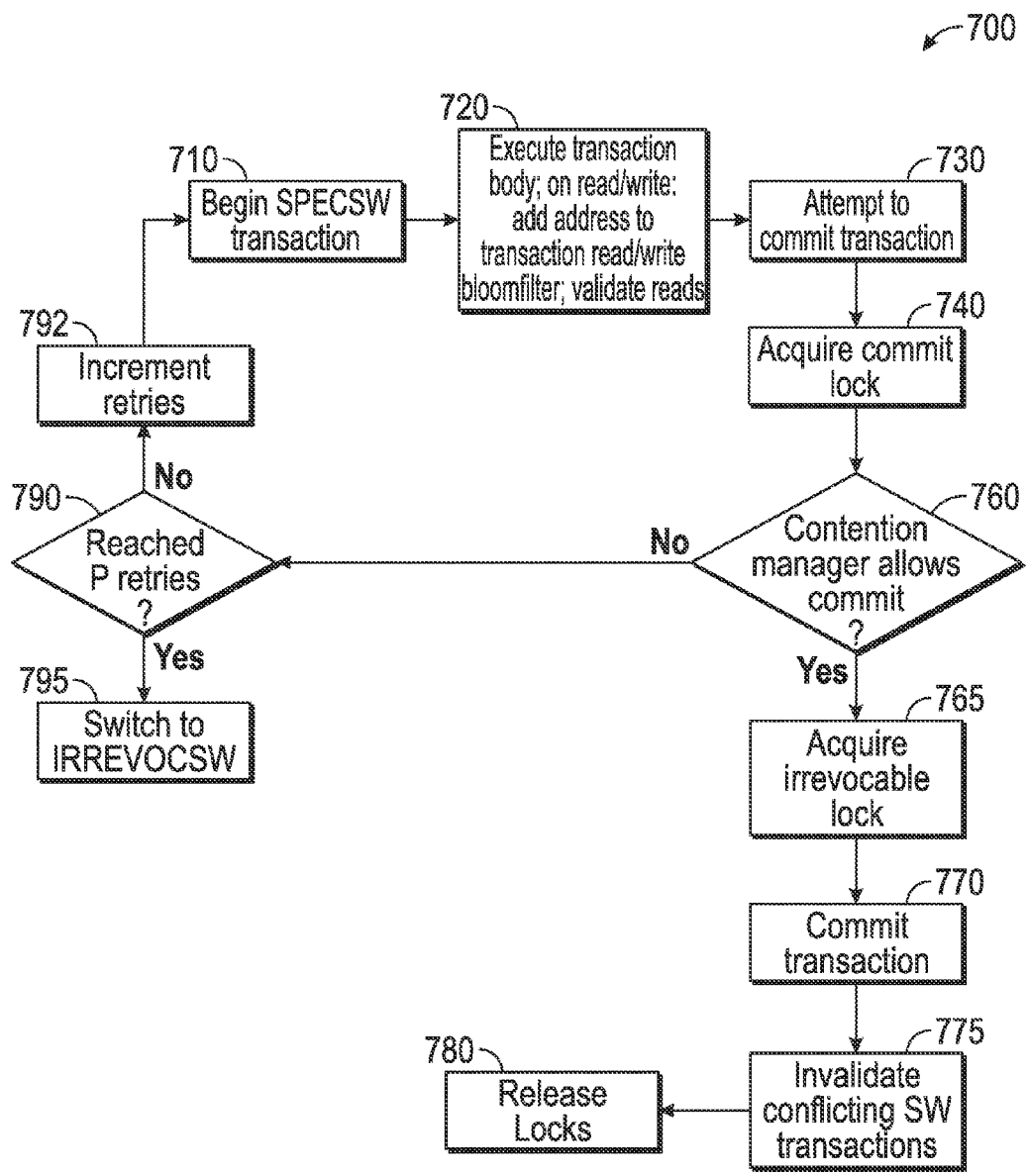
FIG. 10 is a flow diagram of execution of a speculative software transaction in accordance with an embodiment.

FIG. 10 is a flow diagram of execution of a speculative software transaction in accordance with an embodiment. Method 700 begins execution of the software transaction (block 710). Next, the transaction body is executed (block 720). As seen, during execution read and write locations are recorded to a Bloom filter. On commit (block 730), the transaction acquires the commit lock (block 740) and consults a contention manager (at block 760) (which may be implemented in hardware, software, firmware, or other logic or combinations thereof) to determine whether it is to commit or abort (so that conflicting in-flight software transactions can continue to execute). If the contention manager decides to abort the transaction, then the transaction releases the commit lock and retries as a SpecSW transaction depending on the number of retries determined at diamond 790. If below this threshold, a retry counter is incremented at block 792 and the transaction is re-executed in the speculative software transaction mode (at block 710). If above the threshold, the transaction is switched to the irrevocable software transaction mode at block 795.

Otherwise, if the transaction is able to commit, it acquires an irrevocable lock (at block 765), commits its changes to memory (at block 770), invalidates in-flight conflicting software transactions (at block 775) and release the locks (at block 780).

Figure 11:
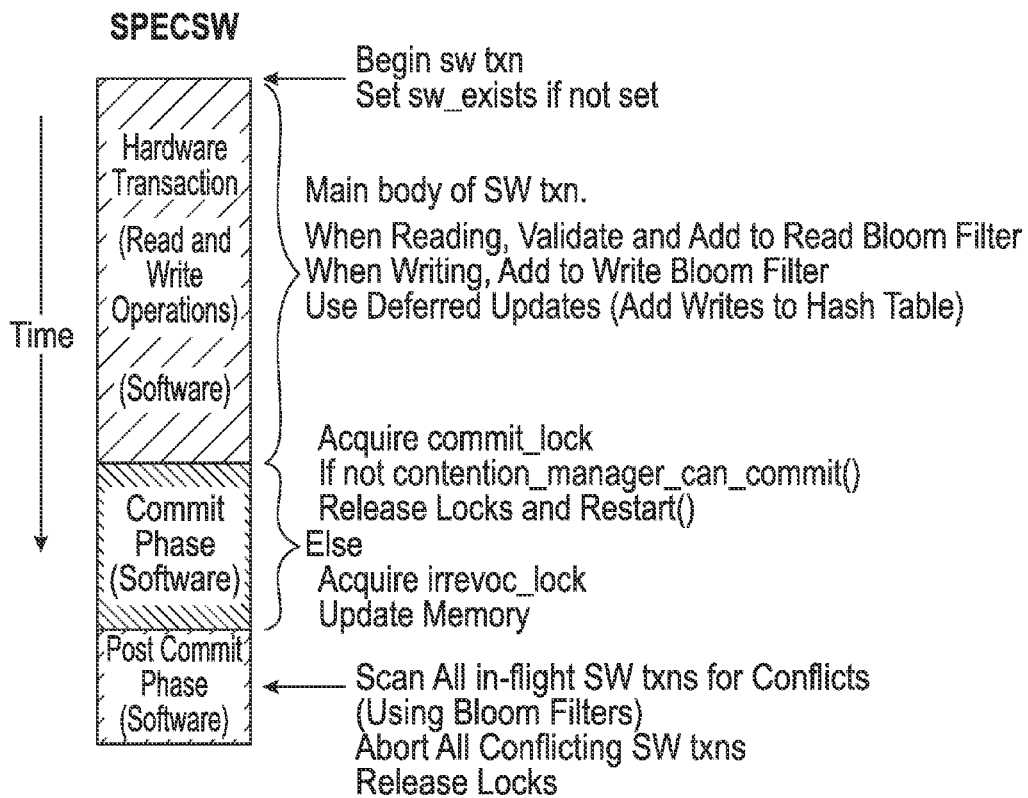
FIG. 11 illustrates details of a software transaction execution in accordance with an embodiment.

Further details of a SpecSW transaction execution are shown in FIG. 11. As seen, speculative software transaction 701 performs all phases in software. In the embodiment of FIG. 11, during the main execution, reads are validated and added to a read Bloom filter, while writes are added to a write Bloom filter. Note that deferred updates may be performed by writing any updated values to a hash table or other temporary storage. During the commit phase, assuming that the transaction is allowed to commit, it obtains an irrevocable lock and updates memory. Otherwise, it releases the lock and restarts the transaction. Then in the post-commit phase, the transaction performs invalidation, invalidating any conflicting software transactions, prior to releasing the locks.

Finally, note that SpecSW transactions provide for correct execution even when a BFHW is committing. If a SpecSW transaction has already started the commit process when a BFHW is ready to commit, the BFHW transaction will observe that the commit lock is taken and will check its Bloom filter against the software Bloom filter for conflicts. If there are no conflicts, the hardware transaction can commit, otherwise the BFHW will abort.

However, if BFHW checks the commit lock before the SpecSW transaction started the commit phase, then one of two situations can happen: the commit lock is changed before the BFHW hardware transaction commits (which aborts the hardware transaction, eliminating any potential conflicts); or the commit lock is changed after the BFHW hardware transaction commits. The speculative software transaction does not check for conflicts with hardware transactions, and thus it could miss a conflict with the freshly committed hardware transaction and could start committing its changes to memory. To avoid this situation, all SpecSW transactions check all hardware transactions' locks after acquiring the commit lock and wait until they are free. If the SpecSW transaction is still valid when the transaction locks are free, then it did not have any conflicts with any committed hardware transactions.

Figure 12:
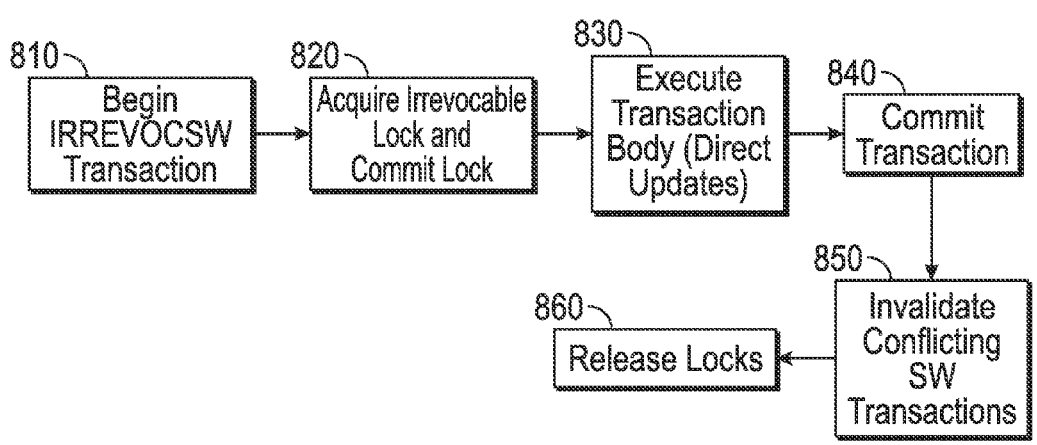
FIG. 12 is a flow diagram of execution of an irrevocable software transaction in accordance with an embodiment.

Referring now to FIG. 12, shown is a flow diagram of execution of an irrevocable software transaction, IrrevocSW. As seen in FIG. 12, method 800 starts at a beginning phase of the transaction (block 810). Next the transaction acquires both the irrevocable lock and commit lock (block 820). Then the main transaction body may be performed at block 830. Note that for an irrevocable software transaction, all updates are performed in place (directly to memory) and thus the transaction acquires both irrevocable and commit locks as soon as it starts execution to ensure serializability. Next, the transaction commits (block 840). Thereafter conflicting software transactions are invalidated, e.g., based on Bloom filter set intersections (block 850). Finally, both locks are released (block 860).

Figure 13:
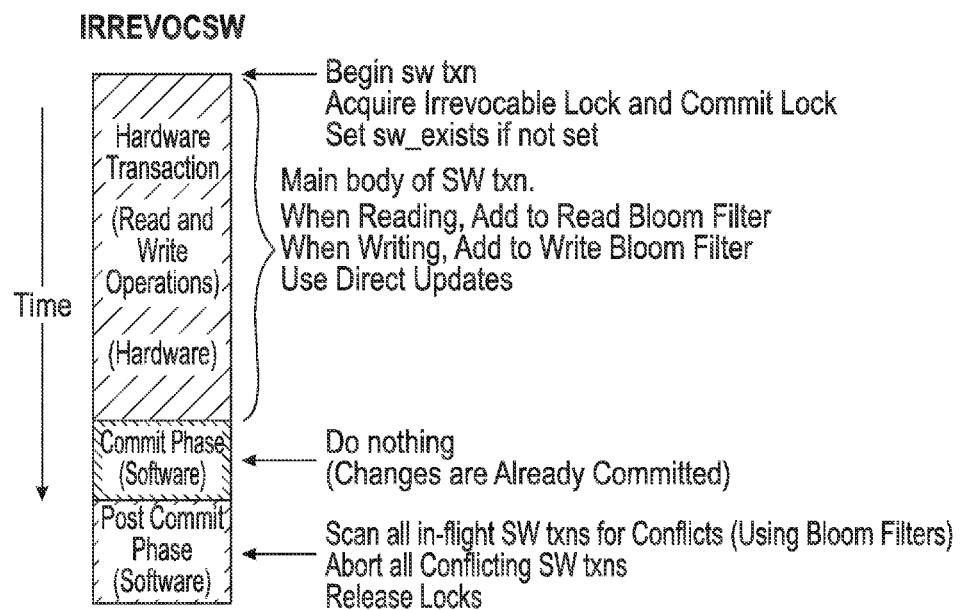
FIG. 13 illustrates details of an irrevocable software transaction in accordance with an embodiment.

FIG. 13 shows further details of an irrevocable software transaction 801 in accordance with an embodiment. Note that at a beginning of execution, both locks are acquired and a software flag is set. In the main body although direct updates are used, reads and writes are added to corresponding Bloom filters, to enable later invalidation with conflicting software transactions. In an embodiment, an irrevocable transaction cannot be aborted, and thus the commit phase is essentially a no operation (NOP). The post-commit phase is similar to a speculative software transaction's post-commit phase: the current transaction is already committed and thus it invalidates in-flight conflicting software transactions.

In an embodiment, a contention manager is used by speculative software transactions to determine if they can commit when they reach their commit phase. The contention manager considers all in-flight transactions that would be aborted if the committing transaction is allowed to commit, and makes a decision on which transaction or transactions to abort are allowed to make forward progress based on various factors. In an embodiment, this decision may be based on priority, read and write set sizes of the committing and conflicting transactions, and each thread's transactional progress (e.g., the number of commits thus far), among other factors.

Invalidation performed after commitment ensures that new transactions can start during the commit phase, without being missed by the invalidation process. If a transaction is missed by the invalidation process because it starts too late, then it started after the committing transaction's invalidation process. Therefore, it started after the committing transaction committed its writes, and thus all the reads of the newly started transaction are serialized after the committing transaction and thus consistent. Table 1 below is a pseudocode representation of an invalidation process in accordance with an embodiment.

TABLE 1

```
if (cm_can_commit(_tm_thrid, conflicts)) {
    irrevoc_lock = _tm_thrid;
    commit(_tm_thrid);
    MEMBARSTLD( );
    for (thr = 0; thr < MAX_THREADS; ++thr) {
        if (txns[thr].status == ACTIVE) {
            if (bf_intersects(&txns[thr].rbloom,
            &txns[_tm_thrid].wbloom)) {
    abort_one(thr, my_commit_cnt);
            }
        }
    }
    irrevoc_lock = CAS_LOCK_EMPTY;
}
```

Validation is performed for every read that is not part of the write set for the transaction performing the read. If the read is part of the write set, then the value is returned from a hash table that stores the updated values for the transaction, and no validation needs to be performed.

In an embodiment, validation may be performed as follows. First, the thread inserts the new read location into its Bloom filter and then it reads the location. The order ensures that a potential conflict will not be missed by the invalidation process of a committing transaction. After reading the value of the read location, it is not safe to be returned yet because another transaction could be in the middle of its commit phase, updating memory locations. If the current read is for a location that was just updated, then returning this read could generate incorrect program behavior because all other reads of the current transaction are from before the committing transaction updated memory.

To avoid this situation, validation code may be executed for all previously unwritten reads. This code checks to see if the irrevocable lock is taken and, if so, it reads the Bloom filter of the software transaction (indicated by an identifier of the irrevocable lock) to determine whether there are any conflicts. If the lock changes in the meantime, the conflict can go unnoticed by the validation code. But at the end of the validation, the transaction checks to see whether it was invalidated by the other software transaction. If the lock was released in the meantime it means that the committing transaction must have finished invalidation. If validation passes and the transaction was not invalidated by a committing transaction, then the read is safe.

Referring now to Table 2, shown is pseudocode of a validation process in accordance with an embodiment.

TABLE 2

```
bf_insert(&txns[_tm_thrid].rbloom, &addr);
MEMBARSTLD( );
val = (*(addr));
local_irrevoc_lock = irrevoc_lock;
if (cas_lock_is_taken(local_irrevoc_lock)) {
    otherbf = txns[local_irrevoc_lock].wbloom;
    if (local_irrevoc_lock == irrevoc_lock) {
        if (bf_intersects(&otherbf, &txns[_tm_thrid].rbloom)) {
            txns[_tm_thrid].status = INVALID;
            restart(_tm_thrid);
        }
    }
}
if (txns[_tm_thrid].status == INVALID) {
    restart(_tm_thrid);
}
```

An irrevocable transaction acquires both the commit lock and the irrevocable lock as it starts executing. A speculative transaction first acquires the commit lock and consults the contention manager as to whether it is able to commit. If the contention manager allows the transaction to commit, the irrevocable lock is acquired, just before writing its updates to memory.

A committing transaction could acquire the irrevocable lock from the beginning of its commit phase, making the commit lock unnecessary. However, the speculative transactions base their validation code on the irrevocable lock being acquired. If the commit lock did not exist and the irrevocable lock was acquired at the start of the commit phase, before consulting the contention manager, the following situation could occur. Consider a SpecSW transaction that performs a read and executes validation code, noticing that its read conflicts with a committing software transaction. Therefore, it decides to restart. The committing transaction consults the contention manager, but it is not allowed to commit (e.g., because of an in-flight transaction with high priority). Therefore, the committing transaction also aborts. However, the other transaction already has aborted. Moreover, a race could occur so that the contention manager bases its abort decision on the transaction that just decided to abort during validation, so the two transactions abort each other, without either making progress.

The commit lock may be used to avoid this situation. A committing transaction therefore acquires the commit lock, which it upgrades to an irrevocable lock only after it has been given permission to commit. The validation code aborts a transaction only because of a conflict with another transaction that holds the irrevocable lock. Therefore, a transaction would only be aborted by validation because of a conflict with a transaction that is certain to commit.

Hardware is used to ensure correctness with respect to concurrent hardware transactions. Hardware transactions are strongly isolated, so changes made to memory become visible to other threads atomically only if the transaction commits. Moreover, conflict detection is implemented in hardware, so on a conflict one of the transactions will be aborted. Therefore, there are no further software components to ensure correct interactions between multiple LiteHW transactions and multiple BFHW transactions.

Conflict detection between concurrent software transactions is ensured using the invalidation method. All committing transactions check for conflicts with the other in-flight software transactions and abort them if there are conflicts. No software transaction can commit during the invalidation process because the committing transaction holds the commit lock. An irrevocable transaction acquires the commit lock as soon as it becomes active and so no other software transaction can become irrevocable or commit during its execution. When the irrevocable transaction commits, it also invalidates in-flight conflicting transactions, ensuring serializable correctness is not violated.

As to hardware—software correctness, LiteHW transactions can run simultaneously with software transactions, but they cannot commit if software transactions are currently executing, in an embodiment. This is because LiteHW transactions do not keep a record of accessed memory locations, so conflict detection between a LiteHW transaction and a software transaction cannot be performed.

In contrast, BFHW transactions keep track of the memory locations they access, so they can perform conflict detection. Moreover, BFHW transactions can commit even when software transactions are executing. If a committing software transaction has a conflict with a BFHW transaction, the latter will be aborted automatically by the hardware. If a committing BFHW transaction has a conflict with an in-flight software transaction, the software transaction is aborted during the BFHW post-commit phase (invalidation phase). Moreover, it is sufficient to compare the Bloom filter of the hardware transaction with the Bloom filter of the software transaction at the end of the hardware transaction. In this way, conflict detection for every read and write of the hardware transaction can be avoided.

Embodiments also enable consistency of memory. For concurrent hardware transactions, opacity is maintained automatically by the hardware since updates do not become visible until the hardware transaction commits, ensuring consistency.

Hardware transactions could get into an inconsistent state by reading memory locations while an irrevocable transaction is executing using direct updates or while a speculative transaction is performing a writeback. However, faults and loops that occur in the hardware transaction will cause the transaction to abort and restart, without noticeable effects on other threads.

Opacity is ensured between software transactions using validation code for each new read, as described above, such that software transactions cannot get into an inconsistent state because of an update caused by another software transaction.

Software transactions could get into an inconsistent state by reading memory locations modified by a hardware transaction that has just committed. In an embodiment, the software transaction is not allowed to commit and is invalidated by the hardware transaction's post-commit phase. However, the software transaction could get into an illegal state before it notices that it was invalidated, as a consequence of having read inconsistent data.

To prevent this situation, an embodiment may provide software sandboxing to SpecSW transactions. Alternatively, opacity for software transactions can be provided using a hardware post-commit counter. In this case, the counter counts the number of hardware transactions that have just committed in BFHW mode and that are currently in post-commit phase. A BFHW transaction increments this counter using a store operation prior to before committing the hardware transaction. If atomicity is violated, the hardware transaction is aborted, leaving no trace of the change. After the post-commit phase is completed, the BFHW transaction decrements the post-commit counter, e.g., using a fetch and substitute instruction. Using this counter, opacity can be realized to SpecSW transactions in the presence of BFHW transactions. SpecSW transactions in turn may read this counter and wait until it reaches zero before adding a new value to their read set. This ensures that all new values read by a SpecSW transaction are read outside the post-commit phase of hardware transactions and thus are consistent (otherwise the SpecSW transaction would have been marked as INVALID during the post commit phase of the BFHW transaction). Moreover, BFHW transactions may use this post-commit counter to ensure consistency of the SpecSW transactions, and to ensure mutual exclusion during the commit phase with the SpecSW transactions (making per transaction locks unused, in an embodiment).

Note that the commit lock serializes the commit phase and post-commit phase of software transactions. However, hardware transactions are not serialized with respect to concurrently committing software and hardware transactions; therefore they can commit and perform invalidation concurrently, making the system more scalable and practical.

Figure 14:
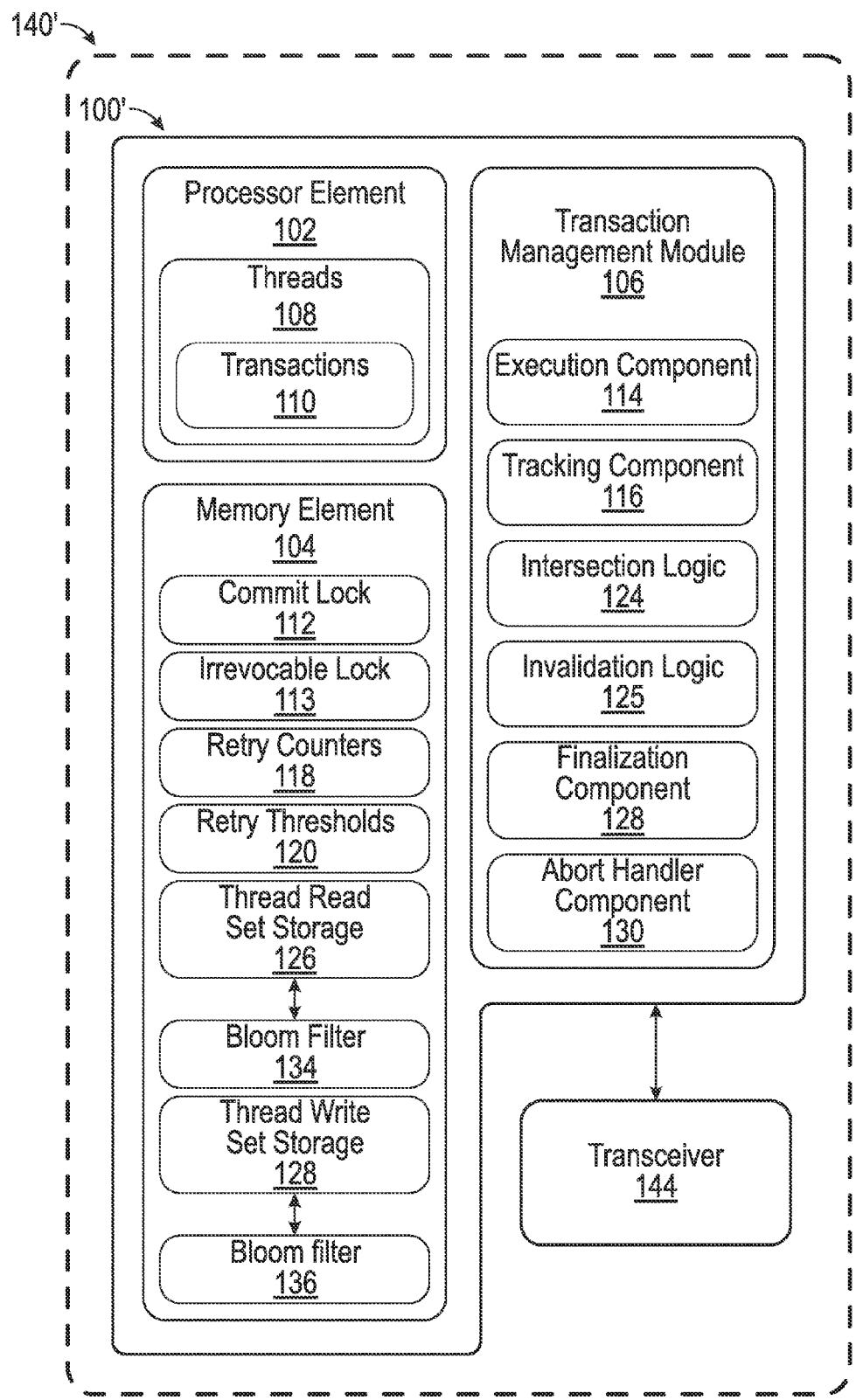
FIG. 14 is a block diagram of a system in accordance with another embodiment.

Referring now to FIG. 14, shown is a block diagram of an apparatus in accordance with another embodiment. As shown in FIG. 14, apparatus 100' includes similar circuitry, components, and logic as with apparatus 100 discussed above with regard to FIG. 1. In fact, in many system implementations, a hybrid transactional memory system may execute on the same hardware, whether it is in accordance with an embodiment implementing a single global lock (as discussed above, e.g., in FIG. 2) or a system implementing multiple locks and multiple software modes transaction modes (e.g., as discussed in FIG. 4).

For ease of discussion, components, circuitry, and logic that are the same in the embodiment of FIG. 14 as in FIG. 1 will not be discussed. Instead, the discussion will focus on the differences in apparatus 100' that enable execution of hybrid transactional memory transactions with multiple hardware transaction modes and multiple software transaction modes. As seen, instead of a single global lock, a commit lock 112 and an irrevocable lock 113 are provided to enable different software transactions to acquire these locks at different times within a transaction depending on transaction mode (of course, understand that additional or different locks may be present in other embodiments). In addition, multiple retry counters 118 may be provided, where each retry counter is associated with a count of retries of a given transaction mode. And similarly, multiple retry thresholds 120 also are provided.

Still with reference to FIG. 14, transaction management module 106 further include an invalidation logic 125 which is configured to perform post-commitment invalidation as described above. In general, the remaining portions of apparatus 100' and system 140' are the same as in FIG. 1. Note that there may be some differences in the implementation of various logic components, given the additional functionality and operations performed in a hybrid transactional memory system such as discussed in connection with FIGS. 4-13. Further, understand that although shown at this high level in FIG. 14, many variations and alternatives are possible.

The following examples pertain to further embodiments.

In Example, 1, an apparatus comprises: a processor; an execution logic to enable, in a transactional memory system, concurrent execution of at least one first software transaction of a first software transaction mode and a second software transaction of a second software transaction mode and at least one hardware transaction of a first hardware transaction mode and at least one second hardware transaction of a second hardware transaction mode; a tracking logic to activate a flag to indicate that at least one software transaction is undergoing execution in the first software transaction mode or the second software transaction mode; an intersection logic to determine whether, at a conclusion of a first hardware transaction of the second hardware transaction mode, a filter set of the first hardware transaction of the second hardware transaction mode conflicts with a filter set of the at least one software transaction undergoing execution; and a finalization logic to commit the first hardware transaction if there is no conflict, and to abort the first hardware transaction if there is a conflict. Note that in some implementations, one or more of the execution logic, the tracking logic, the intersection logic, and the finalization logic may be implemented in the processor. Also note that the above processor can be implemented using various means. In an example, the processor comprises a system on a chip (SoC) incorporated in a user equipment touch-enabled device. In another example, a system comprises a display and a memory, and includes the processor of one or more of the examples herein.

In Example 2, in the second hardware transaction mode, the first hardware transaction is to optionally update the filter set of the first hardware transaction for each memory access of the first hardware transaction.

In Example 3, in the first software transaction mode, a first software transaction is, at a conclusion of the first software transaction, to optionally obtain a first lock and a second lock, and update a transactional memory of the transactional memory system with write data stored in a hash table.

In Example 4, in the first software transaction mode, after commitment of the first software transaction, the first software transaction is to optionally invalidate another software transaction of the first software transaction mode.

In Example 5, in the second software transaction mode, a second hardware transaction is to optionally obtain a commit lock and a transaction lock before commitment of the second hardware transaction.

In Example 6, wherein the first software transaction of Example 4 is to optionally invalidate the another software transaction if an intersection occurs between a filter set of the first software transaction and a filter set of the another software transaction.

In Example 7, in the first software transaction mode of Example 3, the first software transaction is to optionally validate read data during execution.

In Example 8, in the second software transaction mode of any one of the above Examples: at a beginning of a second software transaction, the second software transaction is to obtain a first lock and a second lock; and during execution of the second software transaction in the second software transaction mode, the second software transaction is to directly update a transactional memory of the transactional memory system.

In Example 9, a method comprises: concurrently executing, by a processor in a transactional memory system, a software transaction of a first thread and a hardware transaction of a second thread; activating a global lock to indicate execution of the software transaction; and at a conclusion of the hardware transaction, determining a state of the global lock and if the global lock is active, determining whether a filter set of the first thread intersects a filter set of the second thread, and if not, committing the hardware transaction.

In Example 10, the method of Example 9 optionally further comprises committing the software transaction and deactivating the global lock at a conclusion of the software transaction.

In Example 11, the method of Examples 9 or 10 optionally further comprises committing the hardware transaction without determining whether the filter sets intersect when the global lock is inactive at the hardware transaction conclusion.

In Example 12, the method of one of Examples 9-11 optionally further comprises: inserting an address of an access to a transactional memory of the transactional memory system by the hardware transaction into the filter set of the first thread; and updating one or more fields of the filter set of the first thread based on hashing the address of the access with one or more hash values.

In Example 13, the method of one of Examples 9-12 optionally further comprises storing the filter set of the first thread in a write set of the first thread, the filter set comprising a Bloom filter.

In Example 14, the method of Example 13 optionally further comprises adding the global lock to the filter set of the first thread and determining the state of the global lock based on determining whether the filter sets intersect.

In Example 15, the method of any one of Examples 9-14 optionally further comprises: concurrently re-hashing a hash table from a first size to a second size in the software transaction; and accessing the hash table in the hardware transaction, and enabling the hardware transaction to commit during the concurrent re-hashing.

In another example, a computer readable medium including instructions is to perform the method of any of the above examples. In yet another example, an apparatus comprises means for performing the method of any one of the above examples.

In Example 16, at least one computer-readable medium includes instructions that when executed enable a system to: perform a second hardware transaction in a second hardware transaction mode of a transactional memory system; commit the second hardware transaction at a conclusion of the second hardware transaction; and after commitment of the second hardware transaction, invalidate at least one software transaction executing concurrently with the second hardware transaction if a conflict exists between the second hardware transaction and the at least one software transaction.

In Example 17, the at least one computer-readable medium of Example 16 optionally further comprises instructions that when executed enable the system, prior to commitment of the second hardware transaction, to determine if a commit lock has been acquired, and if so determine whether a conflict exists between the second hardware transaction and a first software transaction that has acquired the commit lock.

In Example 18, the at least one computer-readable medium of Example 17 optionally further comprises instructions that when executed enable the system, if the conflict exists between the second hardware transaction and the first software transaction, to abort the second hardware transaction, where a conflict is determined to exist if a filter set of the second hardware transaction intersects a filter set of the first software transaction.

In Example 19, the at least one computer-readable medium of Example 17 optionally further comprises instructions that when executed enable the system, after the first software transaction acquires the commit lock, to determine whether one or more transaction locks have been acquired by one or more hardware transactions, and if so, delay commitment of the first software transaction until the one or more transaction locks are released.

In Example 20, the at least one computer-readable medium of Example 17 optionally further comprises instructions that when executed enable the system to: perform a first hardware transaction in a first hardware transaction mode of the transactional memory system; at a conclusion of the first hardware transaction, determine if at least one software transaction is concurrently executing; and if so, abort the first hardware transaction, and otherwise commit the first hardware transaction.

In Example 21, the at least one computer-readable medium of Example 17 optionally further comprises instructions that when executed enable the system to: validate a read operation to a transactional memory of the transactional memory system by the first software transaction during execution of the first software transaction; and if the read operation is validated, add a location of the read operation to a filter set of the first software transaction.

In Example 22, the at least one computer-readable medium of Example 17 optionally further comprises instructions that when executed enable the system to: perform a second software transaction in a second software transaction mode, including acquisition of a first lock and a commit lock at a beginning of execution of the second software transaction, and directly update one or more memory locations during the second software transaction execution; and at a conclusion of the second software transaction, commit the second software transaction, invalidate one or more concurrently executing software transactions of the first software transaction mode, and thereafter release the first lock and the commit lock.

In Example 23, a system comprises: a processor including a hybrid transactional memory logic to perform at least one hardware transaction and at least one software transaction concurrently. The hybrid transactional memory logic may execute a first transaction in a first hardware transaction mode until the first transaction is committed or the first transaction is retried a first threshold number of times in the first hardware transaction mode, and thereafter if the first transaction is not committed, to execute the first transaction in a first software transaction mode. The hybrid transactional memory logic may include an intersection logic to determine whether a filter set associated with the first transaction executed in the first hardware mode conflicts with a filter set associated with a second transaction executed in the first software transaction mode, and responsive to the conflict, the hybrid transactional memory logic is to prevent the first transaction in the first hardware transaction mode from commitment. The system further comprises a transactional memory coupled to the processor.

In Example 24, the hybrid transactional memory logic may optionally execute the first transaction in the first software transaction mode until the first transaction is committed or the first transaction is retried a second threshold number of times in the first software transaction mode, and after the second threshold number of times, to execute the first transaction in a second software transaction mode in which the first transaction is to directly update the transactional memory.

In Example 25, the hybrid transactional memory logic may optionally execute the first transaction in a second hardware transaction mode prior to execution in the first hardware transaction mode, where the hybrid transactional memory logic is to execute the first transaction in the second hardware transaction mode for a third threshold number of times, prior to execution of the first transaction in the first hardware transaction mode.

In Example 26, the hybrid transactional memory logic may optionally cause the first transaction to validate read data during execution in the first software transaction mode, update a filter set associated with the first transaction executed in the first software transaction mode based on an address associated with the read data, and update a hash table with write data.

In Example 27, the hybrid transactional memory logic of Example 26 may optionally cause: a second transaction in a second software transaction mode, to obtain a first lock and a second lock at a beginning of the second transaction and to thereafter directly update the transactional memory during execution of the second transaction; and the first transaction in the first software transaction mode, to obtain the first lock and the second lock at commitment of the first transaction and to thereafter update the transactional memory with the write data from the hash table, and to invalidate at least one other software transaction concurrently executing in the first software transaction mode.

In Example 28, a system for performing transactional memory transactions comprises: means for performing a second hardware transaction in a second hardware transaction mode of a transactional memory system; means for committing the second hardware transaction at a conclusion of the second hardware transaction; and means for, after commitment of the second hardware transaction, invalidating at least one software transaction executing concurrently with the second hardware transaction if a conflict exists between the second hardware transaction and the at least one software transaction.

In Example 29, the system of Example 28 optionally further comprises means for, prior to commitment of the second hardware transaction, determining if a commit lock has been acquired, and if so determining whether a conflict exists between the second hardware transaction and a first software transaction that has acquired the commit lock.

In Example 30, the system of Example 28 optionally further comprises means for, if the conflict exists between the second hardware transaction and the first software transaction, aborting the second hardware transaction, wherein a conflict is determined to exist if a filter set of the second hardware transaction intersects a filter set of the first software transaction.

In Example 31, the system of Example 28 optionally further comprises means for, after the first software transaction acquires the commit lock, determining whether one or more transaction locks have been acquired by one or more hardware transactions, and if so, delaying commitment of the first software transaction until the one or more transaction locks are released.

In Example 32, the system of Example 28 optionally further comprises: means for performing a first hardware transaction in a first hardware transaction mode of the transactional memory system; means for, at a conclusion of the first hardware transaction, determining if at least one software transaction is concurrently executing; and means for, if so, aborting the first hardware transaction, and otherwise committing the first hardware transaction.

In Example 33, the system of Example 28 optionally further comprises: means for validating a read operation to a transactional memory of the transactional memory system by the first software transaction during execution of the first software transaction; and means for, if the read operation is validated, adding a location of the read operation to a filter set of the first software transaction.

In Example 34, the system of Example 28 optionally further comprises: means for performing a second software transaction in a second software transaction mode, including acquiring a first lock and a commit lock at a beginning of execution of the second software transaction, and directly updating one or more memory locations during the second software transaction execution; and means for, at a conclusion of the second software transaction, committing the second software transaction, invalidating one or more concurrently executing software transactions of the first software transaction mode, and thereafter releasing the first lock and the commit lock.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a processor;
   an execution logic to enable, in a transactional memory system, concurrent execution of at least one first software transaction of a first software transaction mode and a second software transaction of a second software transaction mode and at least one hardware transaction of a first hardware transaction mode and at least one second hardware transaction of a second hardware transaction mode, the first hardware transaction mode different than the second hardware transaction mode;
   a tracking logic to activate a flag to indicate that at least one software transaction is undergoing execution in the first software transaction mode or the second software transaction mode;
   an intersection logic to determine, when the flag is activated and a first lock is taken by the at least one software transaction, whether, at a conclusion of a first hardware transaction of the second hardware transaction mode, a filter set of the first hardware transaction of the second hardware transaction mode conflicts with a filter set of the at least one software transaction undergoing execution; and
   a finalization logic to commit the first hardware transaction if there is no conflict, and to abort the first hardware transaction if there is a conflict.

2. The apparatus of claim 1, wherein in the second hardware transaction mode, the first hardware transaction is to update the filter set of the first hardware transaction for each memory access of the first hardware transaction.

3. The apparatus of claim 1, wherein in the first software transaction mode, a first software transaction is, at a conclusion of the first software transaction, to obtain the first lock comprising a commit lock and a second lock comprising an irrevocable lock to indicate the first software transaction is enabled to commit without abort, and update a transactional memory of the transactional memory system with write data stored in a hash table.

4. The apparatus of claim 3, wherein in the first software transaction mode, during a post commit phase and after commitment of the first software transaction, the first software transaction is to invalidate another software transaction of the first software transaction mode.

5. The apparatus of claim 4, wherein in the second hardware transaction mode, a second hardware transaction is to obtain a transaction lock before commitment of the second hardware transaction.

6. The apparatus of claim 4, wherein the first software transaction is to invalidate the another software transaction if an intersection occurs between a filter set of the first software transaction and a filter set of the another software transaction.

7. The apparatus of claim 3, wherein in the first software transaction mode, the first software transaction is to validate read data during execution.

8. The apparatus of claim 1, wherein in the second software transaction mode:
   at a beginning of a second software transaction, the second software transaction is to obtain the first lock comprising a commit lock and a second lock comprising an irrevocable lock to indicate the second software transaction is enabled to commit without abort; and during execution of the second software transaction in the second software transaction mode, the second software transaction is to directly update a transactional memory of the transactional memory system.

9. At least one non-transitory computer-readable medium including instructions that when executed enable a system to:

perform a second hardware transaction in a second hardware transaction mode of a transactional memory system;

take a transaction lock for the second hardware transaction;

commit the second hardware transaction at a conclusion of the second hardware transaction;

in a post-commit phase of the second hardware transaction after commitment of the second hardware transaction, invalidate at least one software transaction executing concurrently with the second hardware transaction if a conflict exists between the second hardware transaction and the at least one software transaction; and at a conclusion of the post-commit phase of the second hardware transaction, release the transaction lock for the second hardware transaction.

10. The at least one non-transitory computer-readable medium of claim 9, further comprising instructions that when executed enable the system, prior to commitment of the second hardware transaction, to determine if a commit lock has been acquired, and if so determine whether a conflict exists between the second hardware transaction and a first software transaction that has acquired the commit lock.

11. The at least one non-transitory computer-readable medium of claim 10, further comprising instructions that when executed enable the system, if the conflict exists between the second hardware transaction and the first software transaction, to abort the second hardware transaction, wherein a conflict is determined to exist if a filter set of the second hardware transaction intersects a filter set of the first software transaction.

12. The at least one non-transitory computer-readable medium of claim 10, further comprising instructions that when executed enable the system to:

perform a first hardware transaction in a first hardware transaction mode of the transactional memory system;

at a conclusion of the first hardware transaction, determine if at least one software transaction is concurrently executing; and if so, abort the first hardware transaction, and otherwise commit the first hardware transaction.

13. The at least one non-transitory computer-readable medium of claim 10, further comprising instructions that when executed enable the system to:

validate a read operation to a transactional memory of the transactional memory system by the first software transaction during execution of the first software transaction; and if the read operation is validated, add a location of the read operation to a filter set of the first software transaction.

14. The at least one non-transitory computer-readable medium of claim 10, further comprising instructions that when executed enable the system to:

perform a second software transaction in a second software transaction mode, including acquisition of a first lock and a commit lock at a beginning of execution of the second software transaction, and directly update one or more memory locations during the second software transaction execution; and at a conclusion of the second software transaction, commit the second software transaction, invalidate one or more concurrently executing software transactions of the first software transaction mode, and thereafter release the first lock and the commit lock.

15. A system comprising:

a processor including a hybrid transactional memory logic to enable, in a transactional memory system, concurrent execution of at least one first software transaction of a first software transaction mode and a second software transaction of a second software transaction mode and at least one hardware transaction of a first hardware transaction mode and at least one second hardware transaction of a second hardware transaction mode, the first hardware transaction mode different than the second hardware transaction mode, wherein the hybrid transactional memory logic is to execute a first transaction in the first hardware transaction mode until the first transaction is committed or the first transaction is retried a first threshold number of times in the first hardware transaction mode, and thereafter if the first transaction is not committed, to execute the first transaction in the first software transaction mode, wherein the hybrid transactional memory logic includes an intersection logic to determine, when a flag to indicate that a second transaction is undergoing execution in the first software transaction mode is activated and a first lock is taken by the second transaction in the first software transaction mode, whether a filter set associated with the first transaction executed in the first hardware mode conflicts with a filter set associated with the second transaction executed in the first software transaction mode, and responsive to the conflict, the hybrid transactional memory logic is to prevent the first transaction in the first hardware transaction mode from commitment; and a transactional memory coupled to the processor.

16. The system of claim 15, wherein the hybrid transactional memory logic is to execute the first transaction in the first software transaction mode until the first transaction is committed or the first transaction is retried a second threshold number of times in the first software transaction mode, and after the second threshold number of times, to execute the first transaction in the second software transaction mode in which the first transaction is to directly update the transactional memory.

17. The system of claim 15, wherein the hybrid transactional memory logic is to execute the first transaction in the second hardware transaction mode prior to execution in the first hardware transaction mode, wherein the hybrid transactional memory logic is to execute the first transaction in the second hardware transaction mode for a third threshold number of times, prior to execution of the first transaction in the first hardware transaction mode.

18. The system of claim 15, wherein the hybrid transactional memory logic is to cause the first transaction to validate read data during execution in the first software transaction mode, update a filter set associated with the first transaction executed in the first software transaction mode based on an address associated with the read data, and update a hash table with write data.

* * * * *